United States Patent
Suzuki

(10) Patent No.: US 6,801,274 B2
(45) Date of Patent: Oct. 5, 2004

(54) COLOR FILTER SUBSTRATE, MANUFACTURING METHOD THEREOF, LIQUID CRYSTAL DEVICE, AND ELECTRONIC APPARATUS

(75) Inventor: Nobutaka Suzuki, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/247,268

(22) Filed: Sep. 19, 2002

(65) Prior Publication Data

US 2003/0063239 A1 Apr. 3, 2003

(30) Foreign Application Priority Data

Sep. 19, 2001 (JP) ......................................... 2001-285382
Aug. 5, 2002 (JP) ......................................... 2002-227676

(51) Int. Cl.$^7$ ....................... G02F 1/1336; G02F 1/1333
(52) U.S. Cl. ....................... 349/106; 349/113; 349/114; 349/187
(58) Field of Search .................... 349/106, 113, 349/114, 187

(56) References Cited

U.S. PATENT DOCUMENTS 5,414,547 A * 5/1995 Matsuo et al. ............... 349/44
6,476,889 B2 * 11/2002 Urabe et al. ............... 349/106

FOREIGN PATENT DOCUMENTS

| EP | 1 109 053 A2 | 12/2000 |
| JP | 11-242226 | 9/1999 |
| JP | 11-305248 | 11/1999 |
| JP | 2000-267081 | 9/2000 |

OTHER PUBLICATIONS

Communication from Taiwan Patent Office re counterpart application.

* cited by examiner

Primary Examiner—Tarifur R. Chowdhury
Assistant Examiner—Hoan Nguyen
(74) Attorney, Agent, or Firm—Harness, Dickey & Pierce, P.L.C.

(57) ABSTRACT

A transflective liquid crystal device 1 of the present invention is formed of a liquid crystal panel 40 composed of a color filter substrate 10, a counter substrate 20, and a liquid crystal layer 30 provided therebetween, and a backlight (lighting means) disposed at the side opposite to a viewing side of the liquid crystal panel. The color filter substrate 10 is formed of transflective layers 12 each having light transmission portions and light reflection portions; first color filters 13 formed so as to correspond to the light transmission portions of the transflective layers 12; and second color filters 14 having spectral characteristics different from those of the first color filters 13 and being formed so as to correspond to the light reflection portions of the transflective layers 12.

10 Claims, 20 Drawing Sheets

FIG. 4
(a) SPECTRAL CHARACTERISTICS OF COLOR FILTER IN REFLECTION MODE
(SPECTRAL CHARACTERISTICS WHEN LIGHT PASSES THROUGH SECOND COLOR FILTER TWICE)
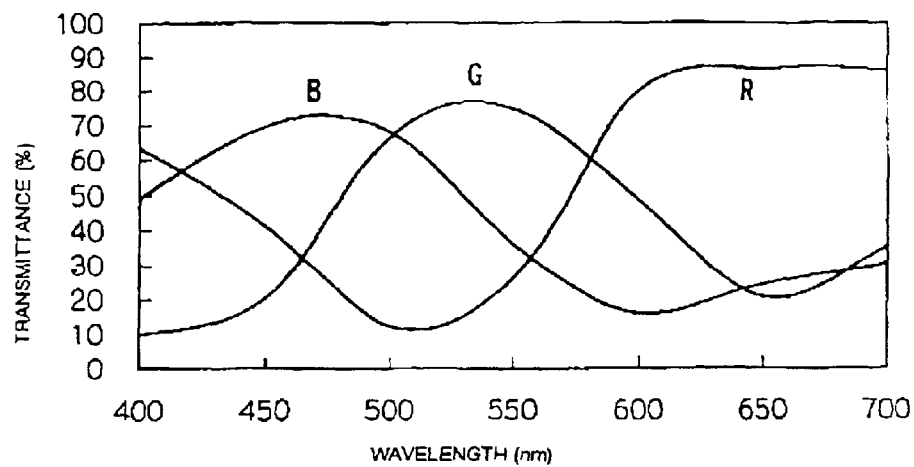
(b) SPECTRAL CHARACTERISTICS OF COLOR FILTER IN TRANSMISSION MODE
(SPECTRAL CHARACTERISTICS WHEN LIGHT PASSES THROUGH FIRST COLOR FILTER ONCE)
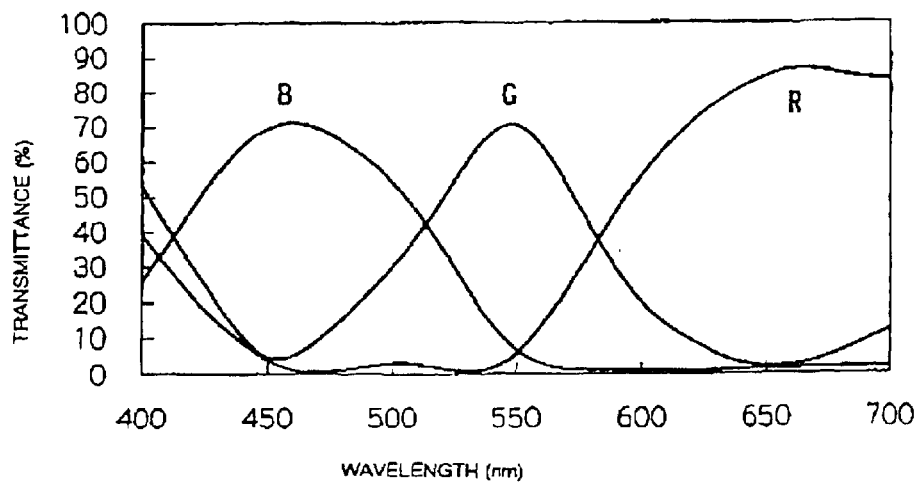

FIG. 19
(a)
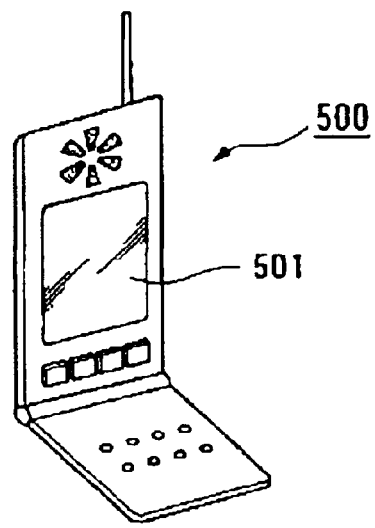
(b)
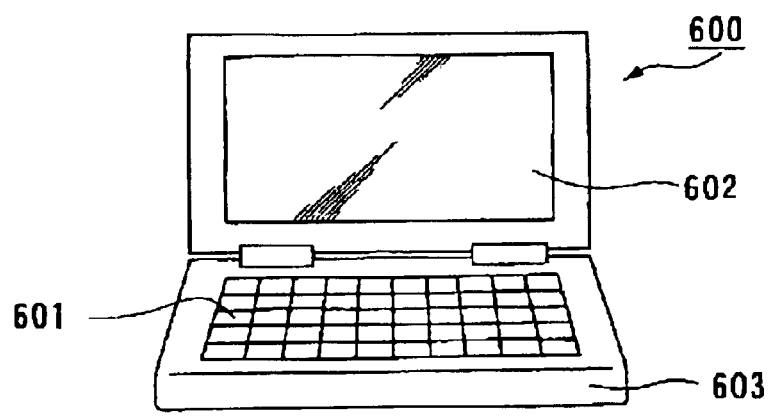
(c)
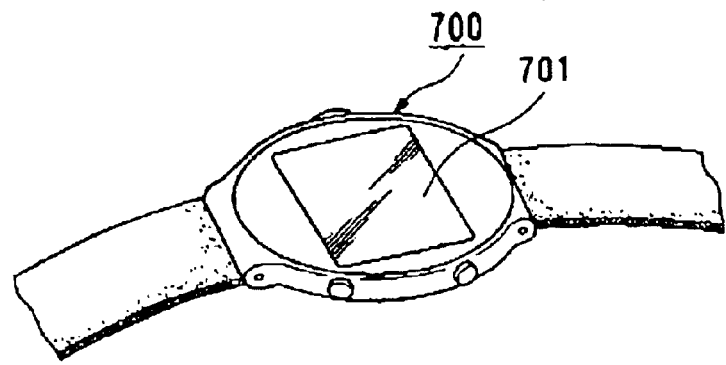

FIG. 20
(a) SPECTRAL CHARACTERISTICS OF COLOR FILTER IN TRANSMISSION MODE
(SPECTRAL CHARACTERISTICS WHEN LIGHT PASSES THROUGH COLOR FILTER ONCE)
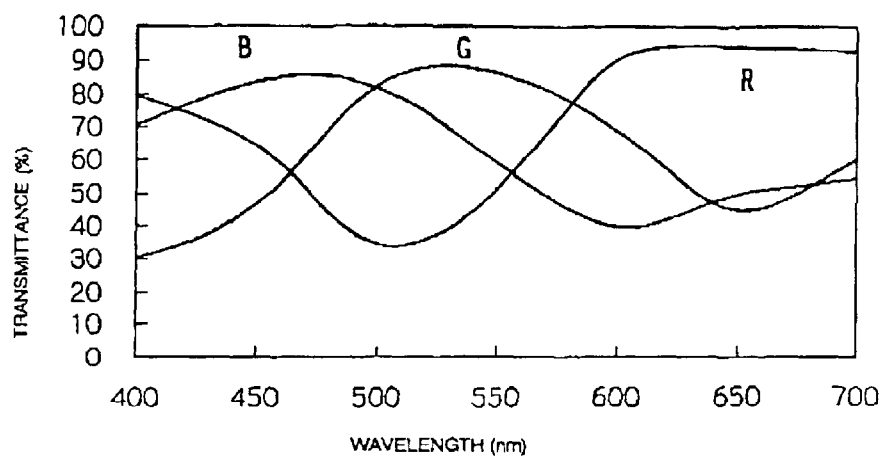
(b) SPECTRAL CHARACTERISTICS OF COLOR FILTER IN REFLECTION MODE
(SPECTRAL CHARACTERISTICS WHEN LIGHT PASSES THROUGH COLOR FILTER TWICE)
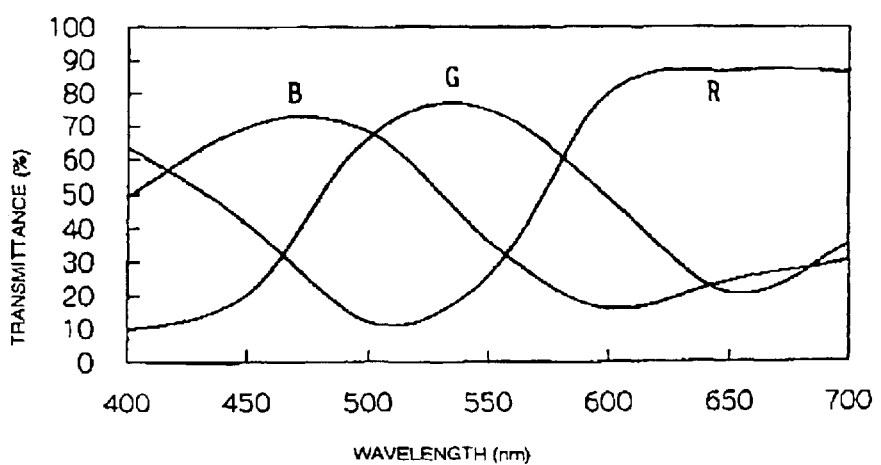

COLOR FILTER SUBSTRATE, MANUFACTURING METHOD THEREOF, LIQUID CRYSTAL DEVICE, AND ELECTRONIC APPARATUS

BACKGROUND OF THE INVENTION

1. Technical Field of the Invention

The present invention relates to color filter substrates, methods for manufacturing color filter substrates, liquid crystal devices, and electronic apparatuses, and more particularly, relates to a transflective liquid crystal device which can improve color purity of display in a transmission mode while brightness and color purity of display in a reflection mode are not degraded and which has superior image quality.

2. Description of the Related Art

As liquid crystal devices, there have been known a transmission type liquid crystal device which performs display using light emitted from a backlight embedded therein and a reflection type liquid crystal device which performs display using outside light such as sunlight. The former liquid crystal device has an advantage in that display can be viewed in a dark place where outside light is not sufficient; however, since a backlight is always turned on, there has been a problem in that power consumption is increased. In contrast, the latter liquid crystal device can save power since lighting means is not embedded therein; however, there has been a problem in that it is difficult to view displays in a dark place.

Accordingly, as a liquid crystal device having advantages of the two devices described above, a transflective liquid crystal device has been known in which display is performed in a dark place in a transmission mode using light emitted form a backlight embedded in the device, and in a bright place with sufficient outside light, display is performed in a reflection mode using outside light. In the transflective liquid crystal device, since display can be viewed in a dark place and also in a bright place using outside light, compared to a transmission type liquid crystal device in which a backlight is always turned on, power saving can be performed.

The transflective liquid crystal device has the primary structure comprising a pair of substrates opposing each other, a liquid crystal layer provided therebetween, and transflective layers provided on a surface at the liquid crystal layer side of one of the substrates, which substrate is located at the side opposite to the viewing side. The transflective layer is formed of, for example, a reflection layer having aperture portions, such as slits, formed in respective dots, and in the transflective layer having the structure described above, the aperture portions and a region other than the aperture portions serve as light transmission portions and light reflection portion, respectively. In addition, a transflective liquid crystal device, which comprises color filters provided on one of the substrates and which is capable of performing color display, has also been known. Hereinafter, a substrate provided with color filters is referred to as "color filter substrate".

In a conventional transflective liquid crystal device, light emitted from a backlight passes through a substrate at the backlight side, a liquid crystal layer, and the substrate at an observer side in that order and is then emitted to the observer side, and by the light described above, display in a transmission mode can be performed. In addition, after passing through the substrate at the observer side and the liquid crystal layer in that order, outside light is reflected from a transflective layer provided on the substrate at the backlight side and is then emitted to the observer side, and by the light described above, display in a reflection mode can be performed.

Accordingly, in a transflective liquid crystal device capable of performing color display, when display is performed in a transmission mode, light incident on a liquid crystal panel passes through the color filter only once and is then emitted to the observer side, and on the other hand, when display is performed in a reflection mode, light incident on the liquid crystal panel passes through the color filter twice before and after being reflected from the transflective layer and is then emitted to the observer side.

As the color filter, a color filter comprising pigment dispersion color portions having red (R), green (G), and blue (B) colors has been widely used. In FIG. 20(a), examples of spectral characteristics (the relationship between wavelength of visible light (light having a wavelength of 400 to 700 nm) incident on the liquid crystal panel and transmittance thereof) of the individual color portions of the pigment dispersion color filter are shown. In FIG. 20(a), R, G, and B show examples of spectral characteristics of the red color portion, the green color portion, and the blue color portion, respectively. Since the spectral characteristics shown in FIG. 20(a) are obtained when light passes through the color filter once, the data shown in this figure corresponds to the spectral characteristics of the color filter when display is performed in a transmission mode.

As shown in FIG. 20(a), the red, green, and blue color portions forming the color filter are provided so as to primarily allow red light (light having wavelengths centered at and near 650 nm), green light (light having wavelengths centered at and near 550 nm), and blue light (light having wavelength centered at and near 450 nm) to pass therethrough, respectively; however, it is also understood that every color portion allows any light having a visible wavelength to pass therethrough. That is, light passing through each color portion of the color filter includes a part of the light having a wavelength which is not desirably displayed although the amount of said part of the light is small as compared to that of another part of the light having a wavelength which is desirably displayed. This results in lowering color purity.

In addition, since spectral characteristics in the case in which light passes' through the color filter twice, that is, spectral characteristics of the color filter when display is performed in a reflection mode, is the square of the spectral characteristics obtained when light passes through the color filter once, for example, the above spectral characteristics are shown in FIG. 20(b).

As shown in FIGS. 20(a) and 20(b), in the conventional transflective liquid crystal device, the spectral characteristics of the color filter in a transmission mode and that of the color filter in a reflection mode are substantially different from each other, and compared to the case in which display is performed in a reflection mode, display performed in a transmission mode has a problem in that the color purity of display is low (range of color reproducibility is small).

The present invention was made in consideration of the situations described above, and an object of the present invention is to provide a color filter substrate which is to be provided in a transflective liquid crystal device, the color filter substrate being capable of improving the color purity of display in a transmission mode while the brightness and color purity of display in a reflection mode are not degraded, and is to provide a manufacturing method thereof. In addition, another object of the present invention is to provide a transflective liquid crystal device capable of improving the color purity of display in transmission mode while the brightness and color purity of display in a reflection mode are not degraded, and is to provide an electronic apparatus comprising this liquid crystal device.

SUMMARY OF THE INVENTION

Through research of the inventor of the present invention to solve the problems described above, a color filter substrate, a method for manufacturing a color filter substrate, a liquid crystal device (transflective liquid crystal device), and an electronic apparatus described below were invented.

A first color filter substrate of the present invention for forming a liquid crystal panel, comprises a base body; transflective layers provided on the base body, each having light transmission portions and light reflection portions; and color filters on the base body, each including a first color filter formed of color portions having colors different from each other and a second color filter formed of color portions having colors different from each other; wherein the first color filter is provided so that the color portions thereof correspond to the light transmission portions of the transflective layers, the second color filter is provided so that the color portions thereof correspond to the light reflection portions of the transflective layers, and the first color filter has spectral characteristics different from those of the second color filter.

A second color filter substrate of the present invention forms a liquid crystal panel which includes a counter substrate, a liquid crystal layer provided between the second color filter substrate and the counter substrate, and transflective layers provided on the counter substrate, each having light transmission portions and light reflection portions. The second color filter substrate described above comprises a base body; and color filters provided on the base body, each having a first color filter formed of color portions having colors different from each other and a second color filter formed of color portions having colors different from each other, wherein the first color filter is provided so that the color portions thereof correspond to the light transmission portions of the transflective layers, the second color filter is provided so that the color portions thereof correspond to the light reflection portions of the transflective layers, and the first color filter has spectral characteristics different from those of the second color filter.

That is, a color filter substrate, provided in a conventional transflective liquid crystal device, has the structure in which color filters for transmission mode display and color filters for reflection mode display have the same spectral characteristics; however, the color filter substrate of the present invention has the structure in which the first color filters for transmission mode display and the second color filters for reflection mode display have spectral characteristics different from each other. Accordingly, in a transflective liquid crystal device provided with the color filter substrate of the present invention, the color purity of display in a transmission mode and the color purity of display in a reflection mode can be independently adjusted.

Accordingly, a color filter substrate for use in a transflective liquid crystal device can be provided which can improve the color purity of display in a transmission mode while the brightness and color purity of display in a reflection mode are not degraded.

In the color filter substrate of the present invention, the first color filters and the second color filters may be formed on the same layer or different layers.

In addition, when display is performed in a transmission mode, light incident on the liquid crystal panel passes through the first color filter once and is then emitted to the observer side, and when display is performed in a reflection mode, light incident on the liquid crystal panel passes through the second color filter having spectral characteristics different from those of the first color filters twice and is then emitted to the observer side. Accordingly, when the spectral characteristics of the first and the second color filters are adjusted so that the color purity of the first color filter is higher than that of the second color filter of the color filter substrate according to the present invention, in a transflective liquid crystal device provided with the color filter substrate described above, the color purity of display in a transmission mode can be improved while the brightness and color purity of display in a reflection mode are not degraded.

In addition, in the color filter substrate of the present invention, the spectral characteristics of the first and the second color filters can be adjusted by compositions of the color portions or by the compositions and thicknesses thereof.

The color filter substrate of the present invention preferably has the structure in which at least one of the light transmission portions and at least one of the light reflection portions of the transflective layer be provided in each dot which forms a display region of the liquid crystal panel, and one of the color portions of the first color filter and one of the color portions of the second color filter, which are provided in the same dot, have the same color. When the color filter substrate having the structure described above is provided in a transflective liquid crystal device, display in a transmission mode or display in a reflection mode can be selectively performed in each dot by a switching operation.

In the color filter substrate of the present invention, a shading layer is preferably provided along the periphery of each dot which forms the display region of the liquid crystal panel. When the color filter substrate having the structure described above is provided in a transflective liquid crystal device, the periphery of each dot, which does not contribute toward performing display, can be shaded, and hence the contrast can be improved.

In addition, in each dot which forms the display region of the liquid crystal panel, a partition for separating the color portion of the first color filter from the color portion of the second color filter is preferably formed. In the structure described above, since the first color filters and the second color filters can be formed by an inkjet method, compared to the case in which the first color filters and the second color filters are formed by a photolithographic method, simplification of the manufacturing process and manufacturing cost saving can be significantly performed. A method for forming the color filter substrate of the present invention will be described below.

Next, a method for manufacturing the color filter substrate of the present invention will be described.

A method for manufacturing a first color filter substrate of the present invention is a method for manufacturing a color filter substrate having the structure in which at least one light transmission portion and at least one reflection portion of the transflective layer are formed in each dot which forms the display region of the liquid crystal panel, and one of the color portions of the first color filter and one of the color portions of the second color filter, which are formed in the same dot, have the same color.

The method described above comprises a step of forming the second color filters on the base body by a photolithographic method; a step of supplying droplets of coloring materials by an inkjet method to regions, which correspond to the light transmission portions of the transflective layers, of the base body provided with the second color filters; a step of annealing the supplied coloring materials for forming the first color filters.

In the case in which the color filter substrate has the shading layer provided along the periphery of each dot which forms the display region of the liquid crystal panel, the method described above may further comprise a step of forming the shading layer by a photolithographic method on the base body along the periphery of each dot which forms the display region of the liquid crystal panel.

In addition, in the case in which the color filter substrate has the shading layer formed along the periphery of each dot which forms the display region of the liquid crystal panel, instead of the step of forming the shading layer by a photolithographic method, the method described above may further comprise a step of supplying droplets of a shading material by an inkjet method to predetermined positions of the base body provided with the second color filters and a step of annealing the supplied shading material for forming the shading layer along the periphery of each dot which forms the display region of the liquid crystal panel.

A method for manufacturing a second color filter substrate of the present invention is a method for manufacturing a color filter substrate having the structure in which at least one of the light transmission portions and at least one of the reflection portions of the transflective layer are formed in each dot which forms the display region of the liquid crystal panel, one of the color portions of the first color filter and one of the color portions of the second color filter, which are formed in the same dot, have the same color, and the shading layer is provided along the periphery of each dot which forms the display region of the liquid.

The method described above comprises a step of forming the shading layers on the base body; a step of forming the first color filters by a photolithographic method on the base body; a step of supplying droplets of coloring materials to regions, which correspond to the light reflection portions of the transflective layers, of the base body provided with the shading layers and the first color filters; and a step of annealing the supplied coloring materials for forming the second color filters.

A method for manufacturing a third color filter substrate of the present invention is a method for manufacturing a color filter substrate having the structure in which at least one of the light transmission portions and at least one of the reflection portions of the transflective layer are formed in each dot which forms the display region of the liquid crystal panel, one of the color portions of the first color filter and one of the color portions of the second color filter, which are formed in the same dot, have the same color, the shading layer is provided along the periphery of each dot which forms the display region of the liquid, and the partition is provided in each dot for separating the color portion of the first color filter from that of the second color filter.

The method described above comprises a step of forming the shading layers on the base body; a step of forming the partitions on the base body; a step of supplying droplets of first coloring materials by an inkjet method to regions, which correspond to the light transmission portions of the transflective layers, of the base body provided with the shading layers and the partitions; a step of annealing the supplied first coloring materials for forming the first color filters; a step of supplying droplets of second coloring materials by an inkjet method to regions, which correspond to the light reflection portions of the transflective layers, of the base body provided with the shading layers and the partitions; and a step of annealing the supplied second coloring materials for forming the second color filters.

According to the methods for manufacturing the first to the third color filter substrates of the present invention, since at least one of the first color filter and the second color filter can be formed by an inkjet method, compared to the case in which the first color filters and the second color filters are formed by a photolithographic method, simplification of the manufacturing process and manufacturing cost saving can be performed.

When color filters are formed by a photolithographic method, after coloring materials having photosensitivity are applied to the entire surface of the base body, color filters composed of color portions having a predetermined pattern are formed by exposure and development of the coloring materials. In contrast, when the color filters are formed by an inkjet method, after droplets of coloring materials are supplied only to regions at which color portions are to be formed, color filters composed of color portions having a predetermined pattern can be formed by annealing.

Accordingly, when the color filters are formed by an inkjet method, compared to the case in which color filters are formed by a photolithographic method, the number of steps can be decreased. In addition to the decrease in the number of steps, since it becomes unnecessary to apply coloring materials to the entire surface of the base body, the usage of the coloring materials can be significantly decreased, and as a result, manufacturing cost can be decreased.

Next, a liquid crystal device of the present invention will be described.

The liquid crystal device (transflective liquid crystal device) of the present invention, in which display in a transmission mode or display in a reflection mode is selectively performed by a switching operation, comprises a liquid crystal panel; and lighting means disposed at the side opposite to a viewing side of the liquid crystal panel. In the liquid crystal device described above, the liquid crystal panel comprises a color filter substrate; a counter substrate opposing thereto; a liquid crystal layer provided between the color filter substrate and the counter substrate; transflective layers provided on one of the color filter substrate and the counter substrate, each having light transmission portions and light reflection portions; and color filters provided on the color filter substrate, each having a first color filter formed of color portions having colors different from each other and a second color filter formed of color portions having colors different from each other; wherein the first color filter is provided so that the color portions thereof correspond to the light transmission portions of the transflective layers, the second color filter is provided so that the color portions thereof correspond to the light reflection portions of the transflective layers, and the first color filter has spectral characteristics different from those of the second color filter.

In the liquid crystal device (transflective liquid crystal device) of the present invention, as is the color filter substrate of the present invention, since the first color filters for transmission mode display and the second color filters for reflection mode display are formed so as to have spectral characteristics different from each other, while the brightness and color purity of display in a reflection mode are not degraded, the color purity of display in a transmission mode can be improved, and hence the image quality can also be improved.

In the liquid crystal device (transflective liquid crystal device) of the present invention, when the spectral characteristics of the first and the second color filters are adjusted so that the color purity of the first color filter is higher than that of the second color filter, while the brightness and color purity of display in a reflection mode are not degraded, the color purity of display in a transmission mode can be improved.

In addition, in the liquid crystal device (transflective liquid crystal device) of the present invention, the spectral characteristics of each of the first and the second color filters can be adjusted by compositions of the color portions or by the compositions and thicknesses thereof.

The liquid crystal device (transflective liquid crystal device) of the present invention preferably has the structure in which at least one of the light transmission portions and at least one of the light reflection portions of the transflective layer be provided in each dot which forms the display region of the liquid crystal panel, and one of the color portions of the first color filter and one of the color portions of the second color filter, which are provided in the same dot, have the same color. When the liquid crystal device having the structure described above is formed, display in a transmission mode or display in a reflection mode can be selectively performed in each dot by a switching operation.

In the liquid crystal device (transflective liquid crystal device) of the present invention, the color filter substrate preferably has a shading layer provided along the periphery of each dot which forms the display region of the liquid crystal panel. According to the structure described above, the periphery of each dot, which does not contribute toward performing display, can be shaded, and hence the contrast can be improved.

In each dot which forms the display region of the liquid crystal panel, a partition for separating the color portion of the first color filter from the color portion of the second color filter is preferably formed. In the structure described above, since the first color filters and the second color filters can be formed by an inkjet method, compared to the case in which the first color filters and the second color filters are formed by a photolithographic method, simplification of the manufacturing process and manufacturing cost saving can be significantly performed.

In addition, in the liquid crystal device (transflective liquid crystal device), as the transflective layer described above, there may be mentioned, for example, a reflection layer provided with aperture portions, in which the aperture portions serve as the light transmission portions, and the reflection layer other than the aperture portions serves as the light reflection portion.

In addition, in the liquid crystal device (transflective liquid crystal device), as the transflective layer described above, there may be mentioned, for example, a reflection layer provided with at least one slit portion at one or two sides thereof, in which the slit portion serves as the light transmission portion, and the reflection layer other than the slit portion serves as the light reflection portion.

Furthermore, when being provided with the liquid crystal device (transflective liquid crystal device) of the present invention described above, an electronic apparatus can be provided which can improve color purity of display in transmission mode while brightness and color purity of display in reflection mode are not degraded and which has superior image quality.

BRIEF DESCRIPTION OF THE DRAWINGS

FIG. 4 includes views showing spectral characteristics of color filter of the transflective liquid crystal device according to the first embodiment of the present invention, FIG. 4(a) is a view showing spectral characteristics of the color filter when display is performed in a reflection mode, and FIG. 4(b) is a view showing spectral characteristics of the color filter when display is performed in a transmission mode.

FIG. 19 includes views showing examples of electronic apparatuses each provided with one of the transflective liquid crystal devices of the embodiments, FIG. 19(a) is a view showing an example of a mobile phone provided with one of the transflective liquid crystal devices according to the above embodiments, FIG. 19(b) is a view showing an example of a mobile information processing apparatus provided with one of the transflective liquid crystal devices according to the above embodiments, and FIG. 19(c) is a view showing an example of a wristwatch type electronic apparatus provided with one of the transflective liquid crystal devices according to the above embodiments.

FIG. 20 includes views showing examples of spectral characteristics of a color filter provided in a conventional transflective liquid crystal device, FIG. 20(a) is a view showing spectral characteristics of the color filter when display is performed in a reflection mode, and FIG. 20(b) is a view showing spectral characteristics of the color filter when display is performed in a transmission mode.

DETAILED DESCRIPTION OF THE PREFERRED EMBODIMENTS

Next, embodiments of the present invention will be described in detail. In the embodiments, description will be made with reference to figures, and reduction scales of layers and members shown in the respective figures are optionally changed so that they are clearly recognized.
First Embodiment
Structure of Transflective Liquid Crystal Device Referring to FIGS. 1 to 3, the structure of a transflective liquid crystal device of a first embodiment of the present invention will be described. In this embodiment, an example in which the present invention is applied to a passive matrix liquid crystal device will be described. In addition, the transflective liquid crystal device of this embodiment is provided with a color filter substrate of the present invention, and in particular, the structure thereof is characteristic.

Figure 1:
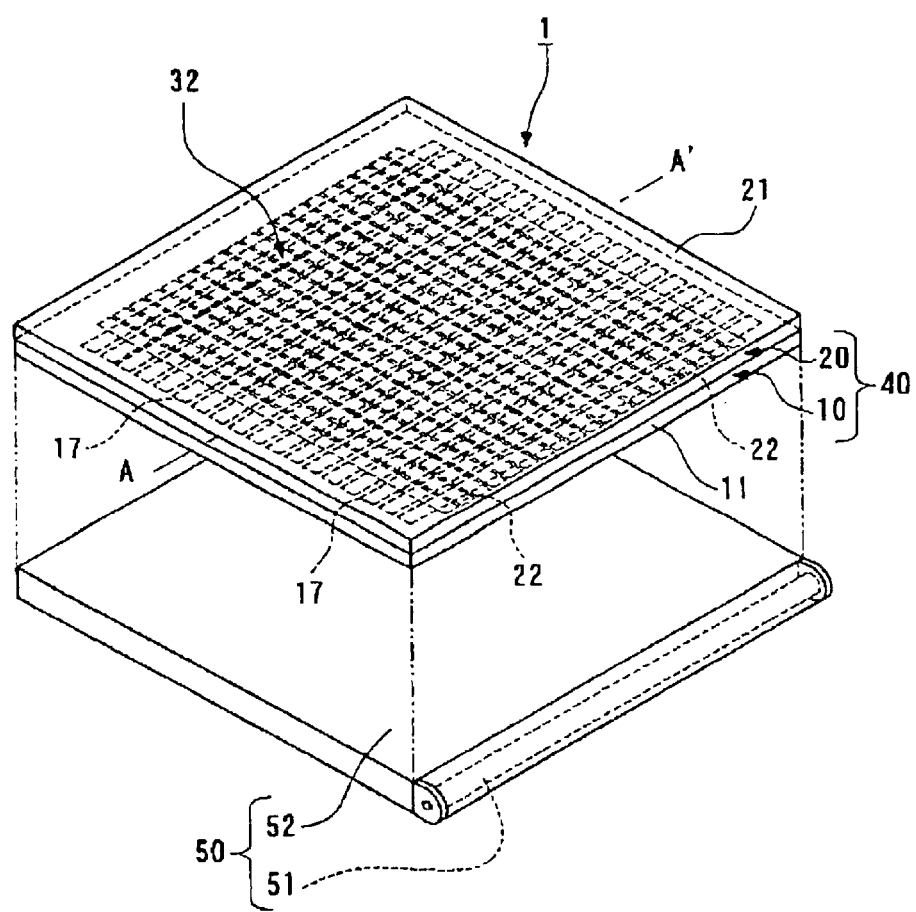
FIG. 1 is a schematic perspective view showing the entire structure of a transflective liquid crystal device according to a first embodiment of the present invention.
Figure 2:
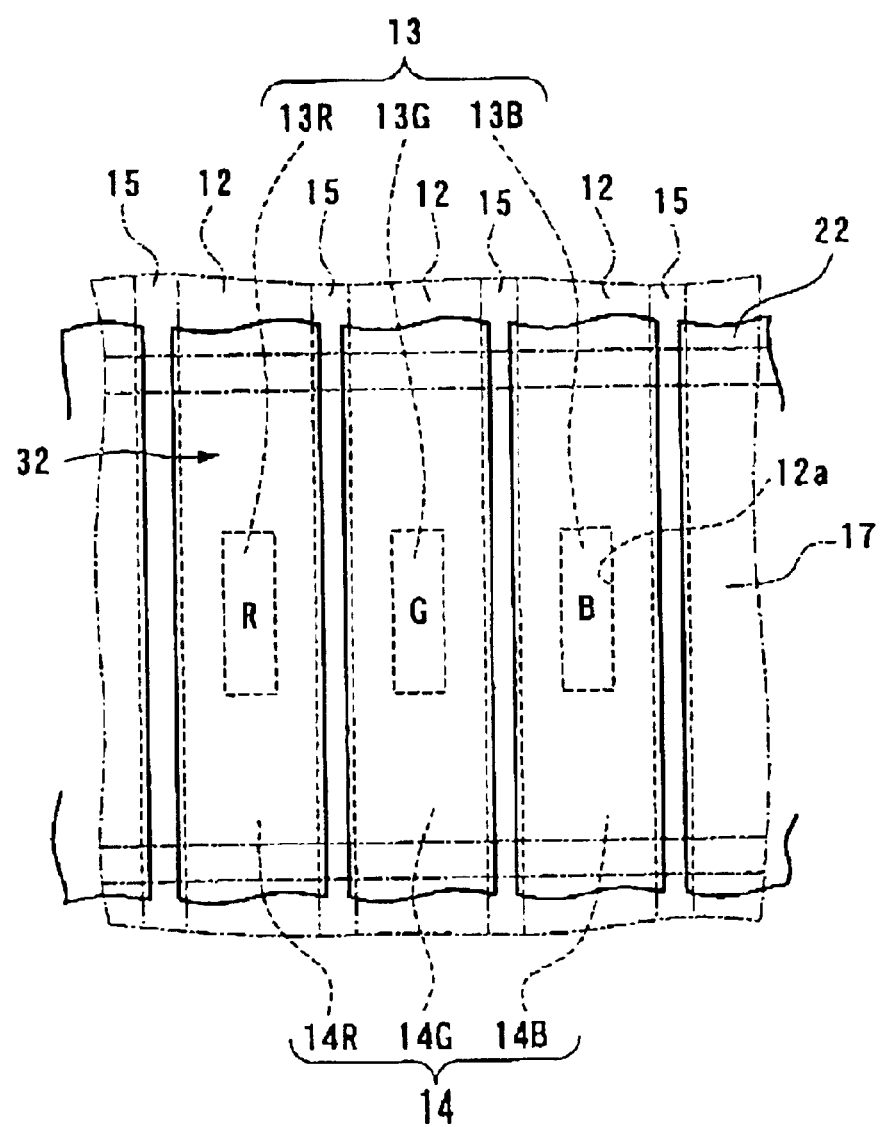
FIG. 2 is a schematic plan view showing an important portion including color filters and shading layers, which is viewed from the liquid crystal layer side, of the transflective liquid crystal device of the first embodiment of the present invention.
Figure 3:
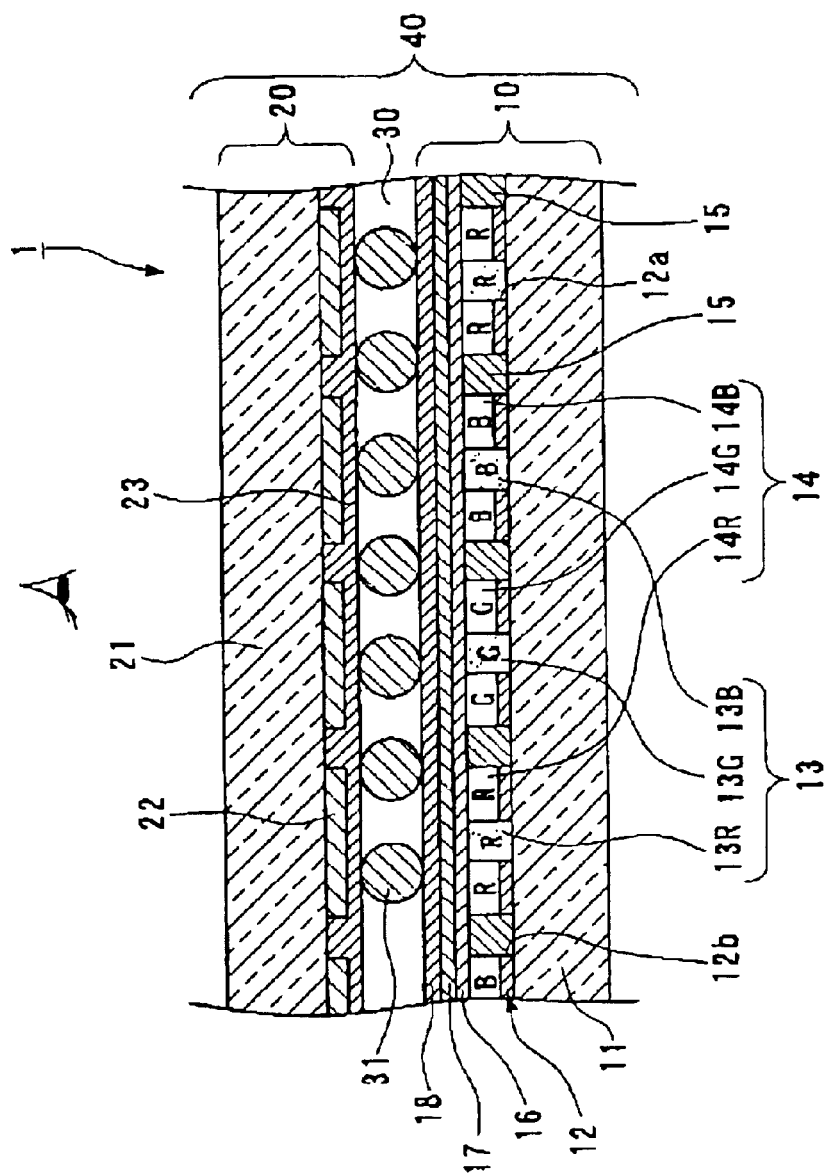
FIG. 3 is a partial, schematic, cross-sectional view showing the transflective liquid crystal device according to the first embodiment of the present invention.

FIG. 1 is a schematic perspective view showing the entire structure of the transflective liquid crystal device of this embodiment. FIG. 2 is a schematic plan view showing color filters and shading layers provided for the transflective liquid crystal device of this embodiment when viewed from the liquid crystal layer side. FIG. 3 is a partial, schematic, cross-sectional view of the transflective liquid crystal device taken along the line A-A' shown in FIG. 1. In FIGS. 1 and 3, the upper side in the figure is shown as the observer side (viewing side).

As shown in FIGS. 1 and 3, a transflective liquid crystal device 1 of this embodiment is formed of a liquid crystal panel 40 comprising a color filter substrate (lower side substrate) 10, a counter substrate (upper side substrate) 20 opposing thereto, and a liquid crystal layer 30 (not shown in FIG. 1) provided between the substrates described above; and a backlight (lighting means) 50 disposed at the side opposite to the viewing side of the liquid crystal panel 40.

The color filter substrate 10 has the primary structure in which transflective layers 12, first color filters 13 such as pigment dispersion color filters, and second color filters 14 such as pigment dispersion color filters, and transparent electrodes 17 are provided on a base body 11 formed of glass, a transparent resin, or the like at the liquid crystal layer 30 side. In addition, the counter substrate 20 has the primary structure in which transparent electrodes 22 are provided on a base body 21 formed of glass, a transparent resin, or the like at the liquid crystal layer 30 side. In FIG. 1, among the layers formed on the color filter substrate 10 and the counter substrate 20, the transparent electrodes are only shown.

In addition, the backlight 50 is formed of a light source 51 composed of a cold cathode bulb or the like and a light guide plate 52 having the structure in which light emitted from the light source 51 is guided to the upper side in the figure so that the liquid crystal panel 40 is efficiently irradiated with light emitted from the light source 51.

On the color filter substrate 10 and the counter substrate 20, a plurality of transparent electrodes 17 and a plurality of transparent electrodes 22, which are formed of an indium tin oxide (ITO) or the like, are provided in a stripe pattern, respectively, and the transparent electrodes 17 on the color filter substrate 10 and the transparent electrodes 22 on the counter substrate 20 extend so as to intersect each other. In addition, rectangular portions at which the transparent electrodes 17 on the color filter substrate 10 and the transparent electrodes 22 on the counter substrate 20 intersect each other and peripheral portions of the rectangular portions form individual dots 32, and a region in which a number of the dots 32 are disposed in a matrix form a display region.

In more particular, in the color filter substrate 10, the transflective layers 12 are formed on the base body 11 at the liquid crystal layer 30 side, each transflective layer 12 being formed of a light reflection material such as aluminum, silver, or a silver alloy and having a slit aperture portion 12a formed approximately at the center of each dot 32 and an aperture portion 12b formed along the periphery of each dot 32. In this transflective layer 12, the aperture portions 12a serve as a light transmission portion through which light passes and a region other than the aperture portions 12a and 12b serves as a light reflection portion from which light is reflected.

In addition, on the transflective layers 12 at the liquid crystal layer 30 side, the first color filters 13 are formed so as to correspond to the light transmission portions (aperture portions 12a) of the transflective layers 12, and the second color filters 14 having spectral characteristics different from those of the first color filters 13 are also formed so as to correspond to the light reflection portions (regions other than the aperture portions 12a and 12b) of the transflective layers 12.

In this embodiment, the first color filter 13 is composed of a red (R) color portion 13R, a green (G) color portion 13G, and a blue (B) color portion 13B, and each color portion is formed in a predetermined pattern corresponding to each dot 32. In addition, in a manner similar to that of the first color filter 13, the second color filter 14 is composed of a red (R)

color portion 14R, a green (G) color portion 14G, and a blue (B) color portion 14B, and each color portion is formed in a predetermined pattern corresponding to each dot 32.

In addition, in the aperture portions 12b of the transflective layers 12, shading layers (black matrix) 15 are formed having a thickness larger than that of the transflective layer 12 and being formed of a shading material, that is, a black resin containing black particles formed of carbon particles or the like, a metal such as chromium, or a metal compound.

The planar structures of the first color filter 13, the second color filter 14, and the shading layer 15, which are viewed from the liquid crystal layer 30 side, are shown in FIG. 2. That is, one of the color portions 13R to 13B of the first color filter 13 is formed approximately at the central portion of each dot 32, and in each dot 32, one of the color portions 14R to 14B of the second color filter 14 is formed along the periphery of a corresponding one of the color portions 13R to 13B of the first color filter 13. In addition, since the shading layer 15 is formed along the periphery of each dot 32, the shading layers 15 are formed in a grid pattern on the whole when viewed in plan view.

In addition, as described above, in each dot 32, two types of color portions (one of the color portions 13R to 13B, and one of the color portions 14R to 14B) are formed, the respective types of color portions forming the first color filter 13 and the second color filter 14, and the two types of the color portions provided in each dot 32 have the same color. In addition, dots 32 having the red color portions 13R and 14R, green color portions 13G and 14G, and blue color portions 13B and 14B display red, green, and blue, respectively, and three dots 32 capable of displaying red, green, and blue form one pixel which can perform display. The alignment pattern of the dots 32 displaying respective colors is not limited to that shown in the figure.

In addition, the surface of the base body 11 on which the first color filters 13, the second color filters 14, and the shading layers 15 are formed is shown flat in FIG. 3; however, in practice, the surface has irregularities. Accordingly, in order to protect the first color filters 13 and the second color filters 14 and to make the surface of the base body 11 flat, an overcoat layer 16 composed of an organic film or the like is formed on the first color filters 13, the second color filters 14, and the shading layers 15 at the liquid crystal layer 30 side.

The transparent electrodes 17 are formed on the overcoat layer 16 at the liquid crystal layer 30 side, and on the topmost surface of the base body 11 at the liquid crystal layer 30 side, an alignment film 18 for controlling the alignment of liquid crystal molecules in the liquid crystal layer 30 is formed. As the alignment film 18, a film which is composed of an orientational polymer such as polyimide and which is processed by rubbing treatment on the surface of the film may be mentioned by way of example. In addition, a retardation film and a polarizer are laminated in practice in that order on the base body 11 at the side opposite to the liquid crystal layer 30; however, they are omitted in the figure.

On the other hand, in the counter substrate 20, the transparent electrodes 22 and an alignment film 23 are formed on the base body 21 at the liquid crystal layer 30 side. In addition, in practice, a retardation film and a polarizer are laminated to each other in that order on the base body 21 at the side opposite to the liquid crystal layer 30; however, they are omitted in the figure. Since the structure of the alignment film 23 is equivalent to that of the alignment film 18 of the color filter substrate 10, the description thereof is omitted.

Furthermore, between the color filter substrate 10 and the counter substrate 20 (in the liquid crystal layer 30), a number of spherical spacers 31 formed of silicon dioxide, resin, or the like are provided so as to maintain a constant cell gap of the liquid crystal panel 40.

Since the transflective liquid crystal device 1 of this embodiment has the primary structure as described above, display in transmission mode is performed in a dark place at which outside light such as sunlight is not sufficient, and display in a reflection mode is performed in a bright place at which outside light is sufficient. Accordingly, the transflective liquid crystal device 1 has the structure in which display in a transmission mode and display in a reflection mode can be selectively performed by a switching operation in accordance with the brightness of outside light.

In more particular, when display in a transmission mode is performed, the backlight 50 is turned on, and display is performed by using light emitted from the backlight 50. That is, after light incident on the color filter substrate 10 of the liquid crystal panel 40 passes through the light transmission portions (aperture portions 12a) formed in the transflective layers 12 and the first color filter 13, it further passes through the liquid crystal layer 30 and the counter substrate 20 and is then emitted to the observer side, and hence display is performed.

In contrast, when display in a reflection mode is performed, the backlight 50 is not turned on, and display is performed by using outside light such as sunlight. That is, after light incident on the liquid crystal panel 40 passes through the counter substrate 20 and the liquid crystal layer 30 in that order, it enters the color filter substrate 10, passes through the second color filter 14, and is reflected from the light reflection portion (region other than the aperture portions 12a and 12b) of the transflective layer 12. Subsequently, after again passing through the second color filter 14, the light passes through the liquid crystal layer 30 and the counter substrate 20 in that order and is then emitted to the observer side, and hence display is performed.

As described above, when display in a transmission mode is performed, image is created by light incident on the liquid crystal panel 40 which passes through the first color filter 13 only once, and on the other hand, when display in a reflection mode is performed, image is created by light incident on the liquid crystal layer 30 which passes through the second color filter 14 twice. However, in this embodiment, since the first color filter 13 and the second color filter 14 having different spectral characteristics from each other are formed for the display in transmission mode and the display in a reflection mode, respectively, each of the respective spectral characteristics described above can be independently adjusted. In addition, in this embodiment, the color purity of the first color filter 13 is formed higher than that of the second color filter 14.

The spectral characteristics (color purities) of the first and the second color filters 13 and 14 can be adjusted by the compositions of individual color portions or by the compositions and the thicknesses thereof. That is, by adjusting a concentration, a size, a shape, or a type of color particle of a pigment contained in each color portion, the spectral characteristics (color purity) of each color portion can be adjusted. For example, when a color portion having a constant thickness is formed by using the same type, size, and the like of color particles, the color purity of the color portion is increased with increase in concentration of the color particles to be used. In addition, the spectral characteristics (color purity) of each color portion also vary in accordance with the thickness thereof. In the case in which the color portion is formed of a predetermined composition, the color purity of the color portion is increased with increase in the film thickness. As described above, when the composition of each color portion or the composition and thickness of each color portion are adjusted, the first and the second color filters 13 and 14 each having desired spectral characteristics (color purity) can be formed.

Hereinafter, examples of the spectral characteristics of the first and the second color filters 13 and 14 will be described.

In this embodiment, when a conventional color filter having, for example, the spectral characteristics shown in FIG. 20(a) is formed as the second color filter 14, and display is performed in a reflection mode, as described with reference to FIG. 20, since light incident on the liquid crystal panel 40 passes through the second color filter 14 twice, the spectral characteristics (spectral characteristics when light passes through the second color filter 14 twice) of the color filter in a reflection mode are as shown in FIG. 4(a). The spectral characteristics shown in FIG. 4(a) are the same as those shown in FIG. 20(b).

On the other hand, in a conventional transflective liquid crystal device, for example, the spectral characteristics of the color filter in a transmission mode is that shown in FIG. 20(a), and the transmittance of light having a wavelength which is not desirably displayed is large. In contrast, in this embodiment, as the first color filter 13, a color filter having spectral characteristics superior to those of a conventional color filter is formed. In addition, the first color filter 13 is preferably formed so that the spectral characteristics in a transmission mode are equivalent or superior to those in a reflection mode.

In particular, as the first color filter 13, for example, a color filter having the spectral characteristics shown in FIG. 4(b) may be formed. When display in a transmission mode is performed, since light incident on the liquid crystal panel 40 passes through the first color filter 13 once, the spectral characteristics of the color filter shown in FIG. 4(b) corresponds to those of a color filter when display is performed in a transmission mode.

In the transflective liquid crystal device 1 of this embodiment thus formed, according to this embodiment, since the first and the second color filters 13 and 14 having different spectral characteristics from each other are formed so as to correspond to the light transmission and light reflection portions of the transflective layer 12, respectively, and the color purity of the first color filter 13 is formed higher than that of the second color filter 14, the color purity of display in a transmission mode can be improved while the brightness and color purity of display in a reflection mode are not degraded, and hence a transflective liquid crystal device having superior image quality can be provided.

In the transflective liquid crystal device 1 of this embodiment, as the light transmission portion of the transflective layer 12, one slit aperture portion 12a is formed approximately at the central portion of each dot 32; however, the present invention is not limited to the structure described above, and the shape, position, and number of the aperture portions 12a formed in each dot 32 may be optionally designed.

In addition, in this embodiment, the aperture portion 12b is formed in the transflective layer 12 along the periphery of each dot 32, and the shading layer 15 is formed in the aperture portion 12b; however, the present invention is not limited to the structure described above, and without forming the aperture portion 12b along the periphery of each dot 32, the shading layers 15 may be formed on the transflective layers 12.

In this embodiment, the first and the second color filters 13 and 14 are directly formed over the transflective layer 12 without providing other layers; however, the present invention is not limited to the structure described above, and since the first and the second color filters 13 and 14 may be formed at least at the liquid crystal layer 30 side of the transflective layer 12, another layer may be provided between the transflective layer 12 and the first and the second color filters 13 and 14.

Method for Manufacturing Color Filter Substrate

Figure 5:
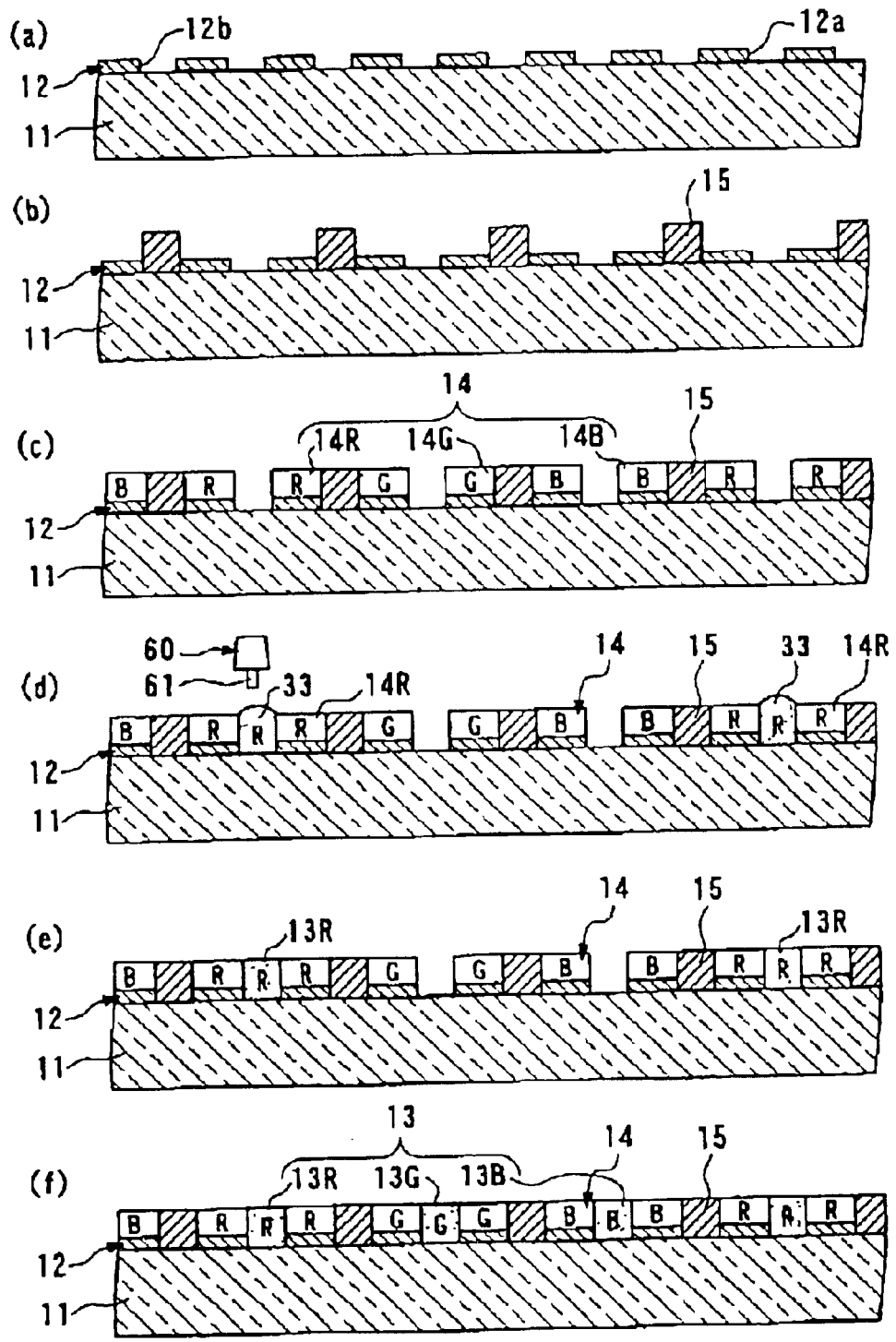
FIG. 5 includes views each showing a step of a manufacturing method of a color filter substrate provided in the transflective liquid crystal device according to the first embodiment of the present invention.

Next, with reference to FIG. 5, a method for manufacturing the color filter substrate 10 provided for the transflective liquid crystal device 1 of this embodiment will be described. FIGS. 5(a) to (f) are schematic cross-sectional views each showing the color filter substrate 10 in a manufacturing step.

First, the base body 11 is prepared, and as shown in FIG. 5(a), the transflective layers 12 (approximately 0.2 to 0.3 μm thick) having a pattern shown in FIG. 3 are formed on the base body 11 at the liquid crystal layer 30 side by a photolithographic method. That is, after a light reflection material is formed by sputtering or the like over the entire surface of the base body 11, and a photoresist is then applied over the entire surface of the base body 11, exposure and development of the photoresist, etching of the light reflection material thus formed, and removal of the photoresist are sequentially performed, thereby forming the transflective layers 12 provided with the aperture portions 12a and 12b each having a predetermined pattern.

Next, as shown in FIG. 5(b), on the base body 11 provided with the transflective layers 12, the shading layers 15 (approximately 1.0 to 2.0 μm thick) having a pattern shown in FIGS. 2 and 3 are formed by a photolithographic method.

The shading layer 15 composed of a black resin and having a predetermined pattern may be formed by, for example, steps described below. After a resist (shading material) having photosensitivity and containing a black pigment is applied by spin coating or the like to the entire surface of the base body 11 provided with the transflective layers 12, annealing, exposure, and development of the resist are performed, thereby forming the shading layer 15 having a predetermined pattern.

In addition, the shading layer 15 composed of a metal such as chromium or a metal compound and having a predetermined pattern may be formed by, for example, steps described below. After a film composed of a metal such as chromium or a metal compound (shading material) is formed by sputtering or the like over the entire surface of the base body 11 provided with the transflective layers 12, and a photoresist is applied to the entire surface of the base body 11, exposure and development of the photoresist, etching of the film composed of the metal or the metal compound, and removal of the photoresist are performed, thereby forming the shading layer 15 having a predetermined pattern.

Subsequently, as shown in FIG. 5(c), the color portions 14R to 14B of the pattern shown in FIGS. 2 and 3 are sequentially formed by a photolithographic method, thereby forming the second color filters 14 (approximately 0.5 to 2.0 μm thick). That is, after a resist having photosensitivity and containing a red pigment (green pigment, and blue pigment) is applied by spin coating or the like to the entire surface of the base body 11 provided with the shading layers 15, annealing, exposure, and development of the resist are performed, thereby forming the red color portions 14R (green color portions 14G and blue color portions 14B) having a predetermined pattern.

Next, by an inkjet method, the first color filters 13 (color portions 13R to 13B) are formed.

That is, as shown in FIG. 5(d), red ink (coloring material) 33 prepared by dissolving a red pigment, a resin such as an acrylic resin, and the like in a solvent is filled in an inkjet nozzle 60, and by relatively moving the inkjet nozzle 60 and the base body 11 while a discharge nozzle 61 of the inkjet nozzle 60 opposes the base body 11, droplets of the red ink 33 are supplied from the discharge nozzle 61 only to regions at which the color portions 13R of the first color filters 13 are to be formed.

In the step described above, as shown in the figure, in a dot 32 which displays red color, since the transflective layer 12 and the color portion 14R of the second color filter 14 are formed along the periphery of the region at which the color portion 13R of the first color filter 13 is to be formed, the transflective layer 12 and the color portion 14R of the second color filter 14 serve as a partition, and hence the red ink 33 can be supplied to the region at which the color portion 13R of the first color filter 13 is to be formed. In this step, as shown in the figure, the red ink 33 thus supplied has a concave central portion because of a surface tension.

Subsequently, as shown in FIG. 5(e), the red ink 33 is calcined by, for example, heating the entire base body 11 provided with the red ink 33 thus supplied to approximately 180° C. for removing the solvent, thereby forming the color portions 13R of the first color filters 13. In this step, the volume of the red ink 33 is decreased since the solvent is removed therefrom, and hence the thickness of the color portion 13R thus formed becomes equivalent to or slightly smaller than the total thickness of the transflective layer 12 and the color portion 14R of the second color filter 14.

In addition, by repeating the steps shown in FIGS. 5(d) and (e) for the green color portions 13G and the blue color portions 13B in a manner equivalent to that described above, the color portions 13R to 13B each having a predetermined pattern are formed. Next, the color portions 13R to 13B are fired by, for example, heating the entire base body 11 provided with the color portions 13R to 13B to approximately 180 to 250° C., thereby forming the first color filters 13 composed of the color portions 13R to 13G each having a predetermined pattern.

As described above, the transflective layers 12, the shading layers 15, the first color filters 13, and the second color filters 14 are formed, and when the overcoat layer 16, the transparent electrodes 17, and the alignment film 18 are then laminated to each other in that order, the color filter substrate 10 can be formed.

According to the manufacturing method of the color filter substrate described above, since the first color filters 13 can be formed by an inkjet method, compared to the case in which the first color filters 13 and the second color filters 14 are formed by a photolithographic method, simplification of the manufacturing process and manufacturing cost saving can be performed.

In the manufacturing method of the color filter substrate described above, when the first color filters 13 are formed by an inkjet method, the case is only described in which the inkjet nozzle 60 is changed and supply and calcination of the ink are performed for each of the color portions 13R to 13B having different colors from each other. However, the present invention is not limited to the case described above. For example, by using an inkjet head having three types of inkjet nozzles 60 used for the respective color portions 13R to 13B and by sequentially supplying, while the head is operated, red ink, green ink, and blue ink to the regions in each pixel at which the respective color portions 13R to 13G are to be formed, the color portions 13R to 13G can be continuously formed. When the color portions 13R to 13G are continuously formed, it is preferable since simplification of the manufacturing process and manufacturing cost saving can be further performed.

In addition, the case in which after the shading layers 15 are formed, the second color filters 14 are formed is only described; however, the present invention is not limited thereto. For example, after the second color filters 14 are formed, the shading layers 15 may be formed.

In this embodiment, the structure is formed in which the shading layer 15 is provided along the periphery of each dot 32. Accordingly, it is preferable since the periphery of each dot 32, which does not contribute toward performing display, can be shaded, and the contrast of display can be improved. However, when a sufficient contrast can be obtained without the shading layers 15, the shading layers 15 may not be formed in some cases. In addition, the method described above for manufacturing the color filter substrate may be applied to the case in which the shading layers 15 are not formed. That is, when the second color filters 14 are formed, since the color portions 14R to 14B of the second color filters 14 serve as partitions, and the first color filters 13 can be formed by an inkjet method, the first and the second color filters 13 and 14 can be formed without the shading layers 15.

Another Method for Manufacturing Color Filter Substrate

Figure 6:
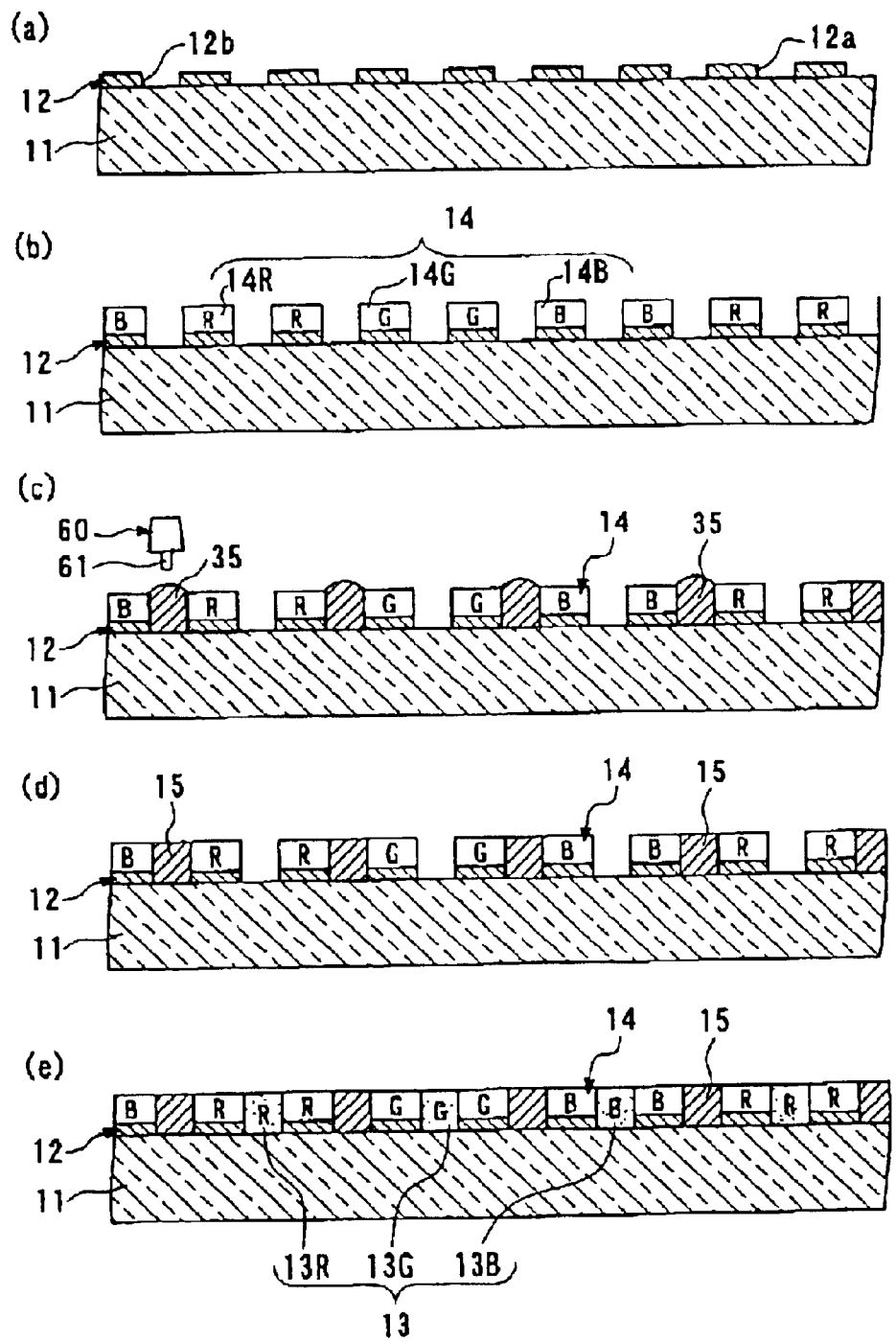
FIG. 6 includes views each showing a step of another manufacturing method of the color filter substrate provided in the transflective liquid crystal device according to the first embodiment of the present invention.

Next, referring to FIG. 6, another method for manufacturing the color filter substrate 10 provided in the transflective liquid crystal device 1 of this embodiment will be described. FIGS. 6(a) to (e) are each a schematic cross-sectional view of the color filter substrate 10 in a manufacturing step.

In the manufacturing method described above of the color filter substrate, the case in which the shading layers 15 are formed by a photolithographic method is described, and in said another method described below for manufacturing the color filter substrate, the case in which the shading layers 15 are formed by an inkjet method will be described.

First, as shown in FIG. 6(a), the transflective layers 12 having a predetermined pattern are formed on the base body 11 at the liquid crystal layer 30 side by a photolithographic method. Next, as shown in FIG. 6(b), on the base body 11 provided with the transflective layers 12, the second color filters 14 are formed by a photolithographic method. Since the methods for forming the transflective layers 12 and the second color filters 14 are described above, the descriptions thereof are omitted.

Next, by an inkjet method, the shading layers 15 are formed.

That is, as shown in FIG. 6(c), black ink (shading material) 35 prepared by dissolving a black pigment, a resin such as an acrylic resin, and the like in a solvent is filled in the inkjet nozzle 60, and the black ink 35 is supplied from the discharge nozzle 61 only to the regions at which the shading layers 15 are to be formed. In this step, as shown in the figure, since the transflective layers 12 and the color portions 14R to 14B of the second color filter 14 are formed along the periphery of the regions at which the shading layers 15 are to be formed, the transflective layers 12 and the color portions 14R to 14B of the second color filter 14 serve as partitions, and hence the black ink 35 can be supplied to the regions at which the shading layers 15 are to be formed. Subsequently, as shown in FIG. 6(d), when the black ink 35 is fired to remove the solvent, the shading layers 15 are formed.

Next, as shown in FIG. 6(e), the first color filters 13 (color portions 13R to 13B) are formed by an inkjet method. Since the inkjet method for forming the first color filters 13 is described above, the description thereof is omitted.

As described above, the transflective layers 12, the shading layers 15, the first color filters 13, and the second color filters 14 are formed, and when the overcoat layer 16, the transparent electrodes 17, and the alignment film 18 are then laminated to each other in that order, the color filter substrate 10 can be formed.

According to said another method for manufacturing the color filter substrate described above, since the shading layers 15 can be formed by an inkjet method as well as the first color filters 13, compared to the manufacturing method of the color filter substrate described above, simplification of the manufacturing process and manufacturing cost saving can be further performed.

In said another method for manufacturing the color filter substrate described above, the case is described in which the first color filters 13 are formed after the shading layers 15 are fired. However, the present invention is not limited thereto, annealing of the shading layers 15 may be simultaneously performed when the color portions 13R to 13B of the first color filters 13 are fired.

In addition, the case in which the first color filters 13 are formed by an inkjet method after the shading layers 15 are formed by an inkjet method is described. However, the present invention is not limited thereto, after the first color filters 13 are formed by an inkjet method, the shading layers 15 may be formed by an inkjet method.

In addition, by using an inkjet head having four types of inkjet nozzles 60 used for the shading layer 15 and the respective color portions 13R to 13B and by sequentially supplying, while the head is operated, black ink, red ink, green ink, and blue ink to the regions in each pixel at which the shading layers 15 and the respective color portions 13R to 13G are to be formed, the shading layers 15 and the first color filters 13 can be continuously formed. When the shading layers 15 and the first color filters 13 are continuously formed, it is preferable since simplification of the manufacturing process and manufacturing cost saving can be further performed.

Still Another Method for Manufacturing Color Filter Substrate

Figure 7:
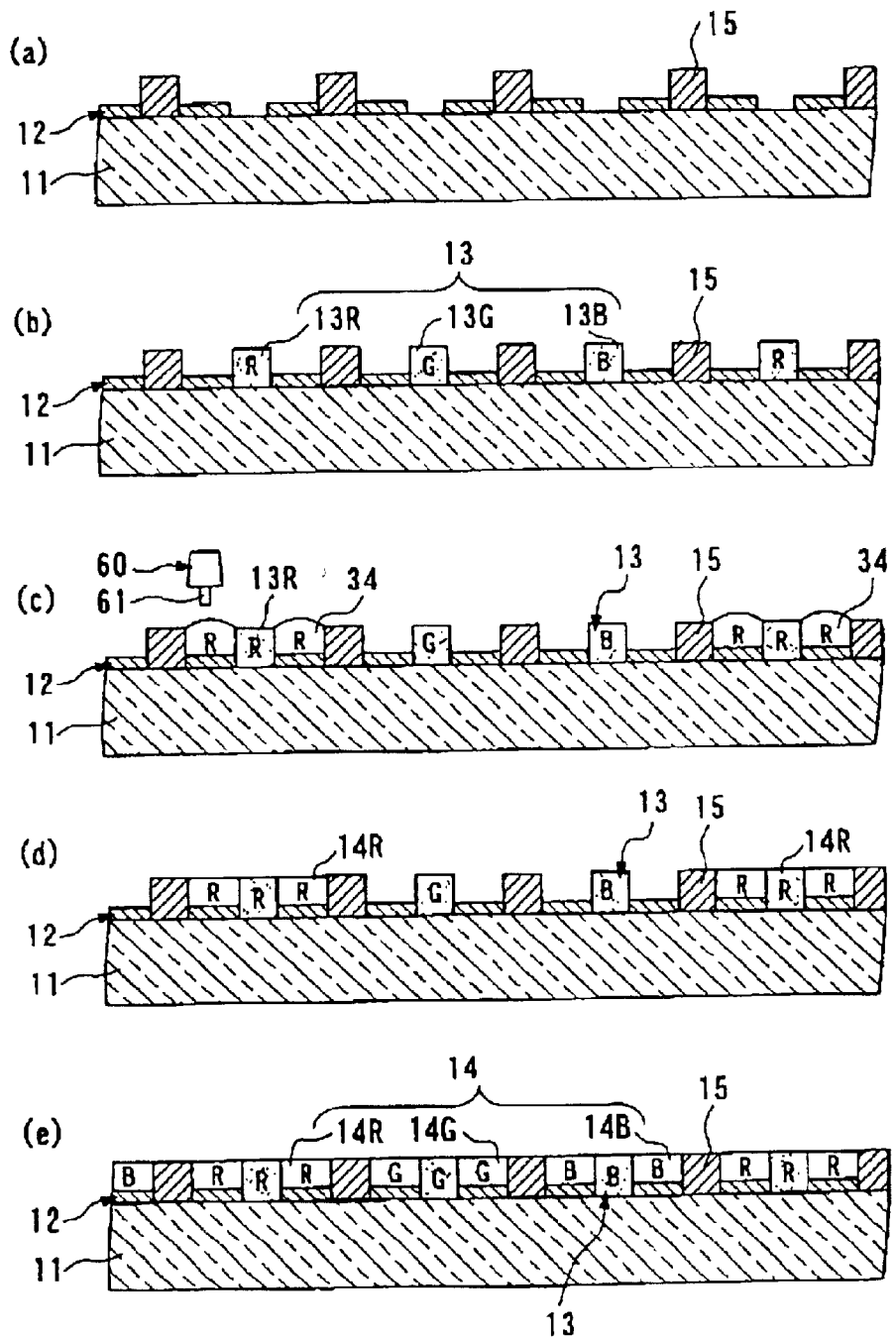
FIG. 7 includes views each showing a step of another manufacturing method of the color filter substrate provided in the transflective liquid crystal device according to the first embodiment of the present invention.

Next, referring to FIG. 7, still another method for manufacturing the color filter substrate 10 provided in the transflective liquid crystal device 1 of this embodiment will be described. FIGS. 7(a) to (e) are each a schematic cross-sectional view of the color filter substrate 10 in a manufacturing step.

In the manufacturing method described above of the color filter substrate, the case is described in which after the second color filters 14 are formed by a photolithographic method, the first color filters 13 are formed by an inkjet method, and in said still another method described below for manufacturing the color filter substrate, the case in which after the first color filters 13 are formed by a photolithographic method, the second color filters 14 are formed by an inkjet method will be described.

First, as shown in FIG. 7(a), the transflective layers 12 (approximately 0.2 to 0.3 μm thick) having a predetermined pattern and the shading layers 15 (approximately 1.0 to 2.0 μm thick) are sequentially formed on the base body 11 at the liquid crystal layer 30 side by a photolithographic method. The photolithographic methods for forming the transflective layers 12 and the shading layers 15 are described above, and hence the descriptions thereof are omitted.

Next, as shown in FIG. 7(b), by sequentially forming the color portions 13R to 13B having the pattern shown in FIGS. 2 and 3 by a photolithographic method, the first color filters 13 (approximately 1.0 to 2.0 μm thick) are formed. That is, after a resist having photosensitivity and containing a red pigment (green pigment, and blue pigment) is applied by spin coating or the like to the entire surface of the base body 11 provided with the shading layers 15, annealing, exposure, and development of the resist are performed, thereby forming the red color portions 13R (green color portions 13G, and blue color portions 13B) having a predetermined pattern.

Next, by an inkjet method, the second color filters 14 (color portions 14R to 14B) are formed.

That is, as shown in FIG. 7(c), red ink (coloring material) 34 prepared by dissolving a red pigment, a resin such as an acrylic resin, and the like in a solvent is filled in the inkjet nozzle 60, and droplets of the red ink 34 are supplied from the discharge nozzle 61 only to the regions at which the color portions 14R of the second color filters 14 are to be formed. In the step described above, as shown in the figure, since the shading layer 15 and the color portion 13R of the first color filter 13 are formed along the periphery of the region at which the color portion 14R is to be formed, the shading layer 15 and the color portion 13R serve as a partition, and hence the red ink 34 can be supplied to the region at which the color filter 14R is to be formed. Subsequently, as shown in FIG. 7(d), the red ink 34 is calcined to remove the solvent, thereby forming the color portions 14R of the second color filters 14.

In addition, by performing the steps shown in FIGS. 7(c) and (d) for the green color portions 14G and the blue color portions 14B in a manner equivalent to that described above, the color potions 14R to 14B each having a predetermined pattern are formed. Next, by annealing the color portions 14R to 14B, the second color filters 14 formed of the color portions 14R to 14B each having a predetermined pattern can be formed.

As described above, the transflective layers 12, the shading layers 15, the first color filters 13, and the second color filters 14 are formed, and when the overcoat layer 16, the transparent electrodes 17, and the alignment film 18 are then laminated to each other in that order, the color filter substrate 10 can be formed.

According to said still another method for manufacturing the color filter substrate described above, since the second color filters 14 can be formed by an inkjet method, compared to the case in which the first color filters 13 and the second color filters 14 are formed by a photolithographic method, simplification of the manufacturing process and manufacturing cost saving can be performed.

In addition, by using an inkjet head having three types of inkjet nozzles 60 used for the respective color portions 14R to 14B and by sequentially supplying, while the head is operated, red ink, green ink, and blue ink to the regions in each pixel at which the respective color portions 14R to 14G are to be formed, the color portions 14R to 14G can be continuously formed. When the color portions 14R to 14G are continuously formed, it is preferable since simplification of the manufacturing process and manufacturing cost saving can be further performed.

Heretofore, said still another method for manufacturing the color filter substrate is described in which the first color filters 13 or the second color filters 14 are formed by an inkjet method. According to this manufacturing method of the color filter substrate, it is preferable since simplification of the manufacturing process and manufacturing cost saving can be performed; however, the present invention is not limited to the case described above. For example, although simplification of the manufacturing process and manufacturing cost saving cannot be performed, the color filter substrate 10 may be manufactured by forming the first and the second color filters 13 and 14 by a photolithographic method.

Second Embodiment

Structure of Transflective Liquid Crystal Device

Next, the structure of a transflective liquid crystal device according to a second embodiment of the present invention will be described. In this embodiment, as in the first embodiment, an example in which the present invention is applied to a passive matrix liquid crystal device will be described.

Figure 8:
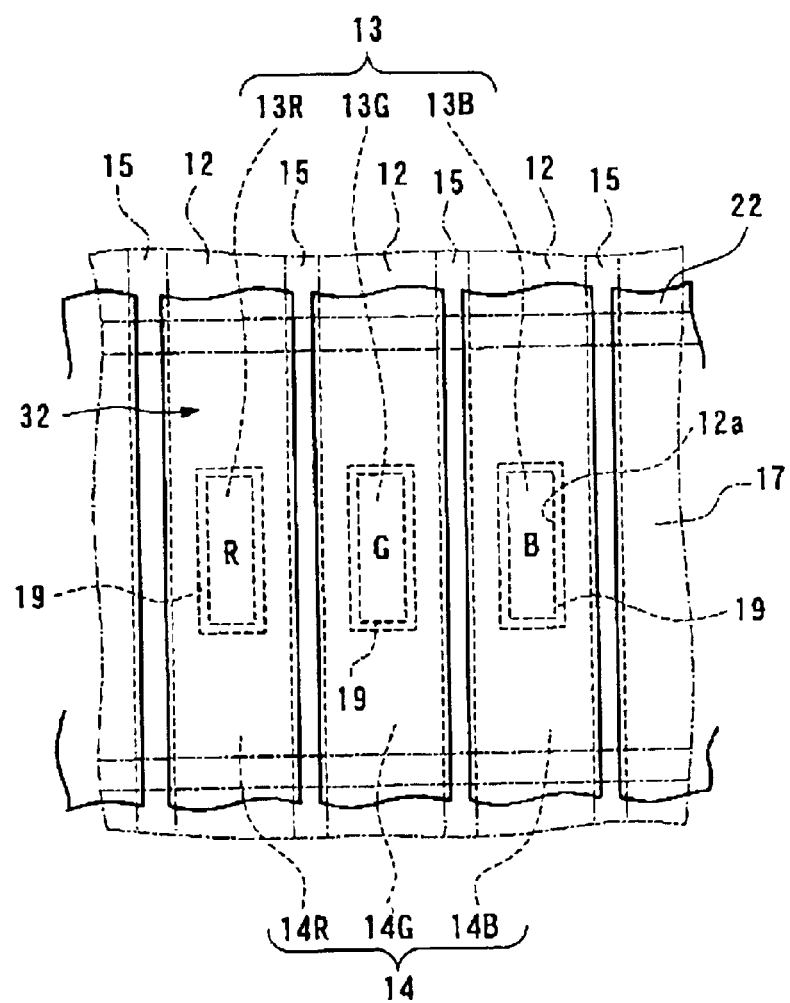
FIG. 8 is a schematic plan view showing color filters, shading layers, and partitions, which are viewed from the liquid crystal layer side, of a transflective liquid crystal device of a second embodiment of the present invention.
Figure 9:
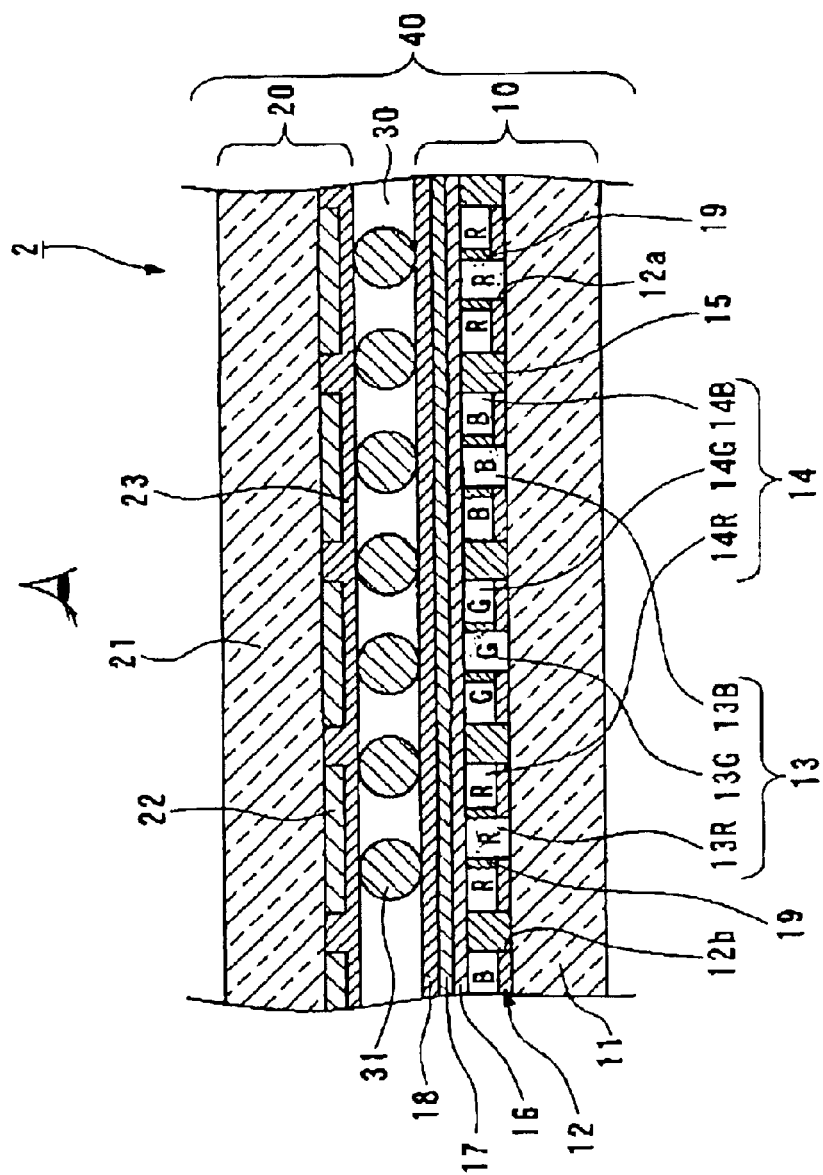
FIG. 9 is a partial, schematic, cross-sectional view showing the transflective liquid crystal device according to the second embodiment of the present invention.

Since the primary structure of the transflective liquid crystal device of this embodiment is equivalent to that of the first embodiment, the same reference numerals of the constituent elements in the first embodiment designate the same constituent elements in this embodiment, and descriptions thereof are omitted. In addition, this embodiment will be described with reference to FIGS. 8 and 9, which correspond to FIGS. 2 and 3 in the first embodiment. FIG. 8 is a schematic plan view of the color filters, the shading layers, and partitions described later provided for the transflective liquid crystal device of this embodiment when viewed from the liquid crystal layer side. FIG. 9 is a partial schematic cross-sectional view of the transflective liquid crystal device of this embodiment.

As shown in FIGS. 8 and 9, in a transflective liquid crystal device 2 of this embodiment, partitions 19 are formed for separating the color portions 13R to 13B of the first color filter 13 from the regions of the color portions 14R to 14B of the second color filter 14, and this is the only point different from the structure of the first embodiment.

In this embodiment, as long as the partitions 19 separate the regions of the color portions 13R to 13B of the first color filter 13 from the regions of the color portions 14R to 14B of the second color filter 14, the partitions 19 may be formed on the transflective layers 12 or in the aperture portions 12a formed in the transflective layers 12, and in this embodiment, the case in which the partitions 19 are formed on the transflective layers 12 is shown in the figure.

As described above, in this embodiment, since the structure is formed in which the color portions 13R to 13B of the first color filter 13 and the color portions 14R to 14B of the second color filter 14 are separated from each other by the partitions 19, the same advantages as those described in the first embodiment can be obtained. In addition, since the first color filters 13 and the second color filters 14 can be formed by an inkjet method, compared to the case in the first embodiment, advantages can be obtained in that simplification of the manufacturing process and manufacturing cost saving can be further performed.

In this embodiment, the partitions 19 may be formed to have a width so that ink for the first color filter 13 and ink for the second color filter 14 are prevented from being mixed together when the color filters are formed, and in particular, the partition 19 having a width of approximately 5 μm may be sufficient for this purpose. In addition, with increase in width of the partition 19, regions for the color portions 13R to 13B or regions for the color portions 14R to 14B are decreased, and hence in consideration of these points described above, the partitions are preferably designed.

The partitions 19 may be formed of any type of material; however, it is preferable that a light transparent material such as a transparent resin be used.

In the case in which the partitions 19 are formed on the transflective layers 12 and are formed of a light transparent material, when display in a reflection mode is performed, light being reflected from the transflective layers 12 and then entering the partitions 19 passes therethrough and is then emitted to the observer side. Accordingly, it is preferable since an amount of light emitted to the observer side can be increased, and the brightness of display can be improved.

In addition, the partition 19 may be formed of the same material (shading material) as that for the shading layer 15. In this case, the effect of improving the brightness of display cannot be obtained; however, since the shading layers 15 and the partitions 19 are formed in the same step, in addition to the advantages of simplification of the manufacturing process and manufacturing cost saving, an advantage of suppressing decrease in contrast of display in a transmission mode can also be obtained.

Method for Manufacturing Color Filter Substrate

Figure 10:
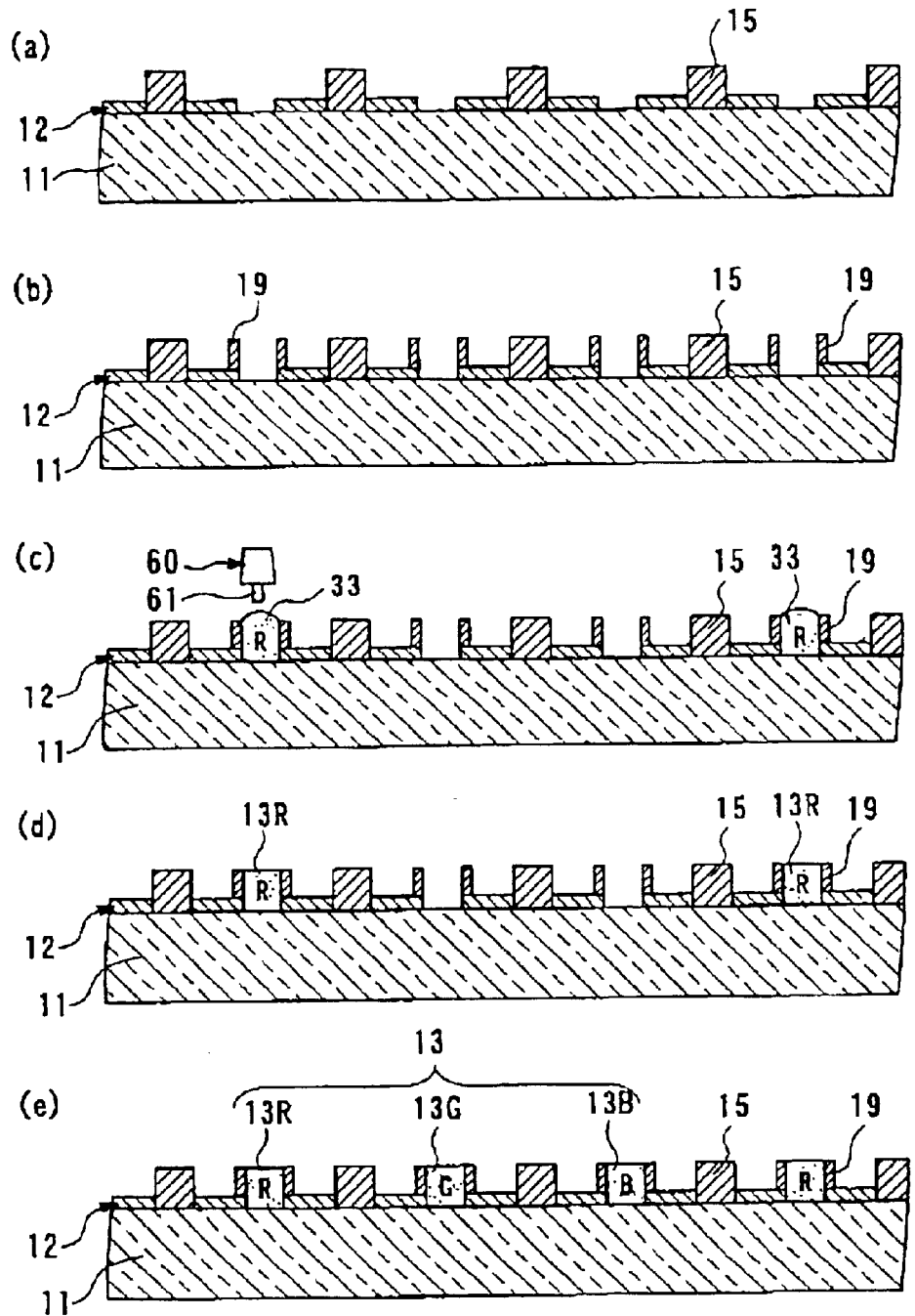
FIG. 10 includes views each showing a step of a manufacturing method of a color filter substrate provided in the transflective liquid crystal device according to the second embodiment of the present invention.
Figure 11:
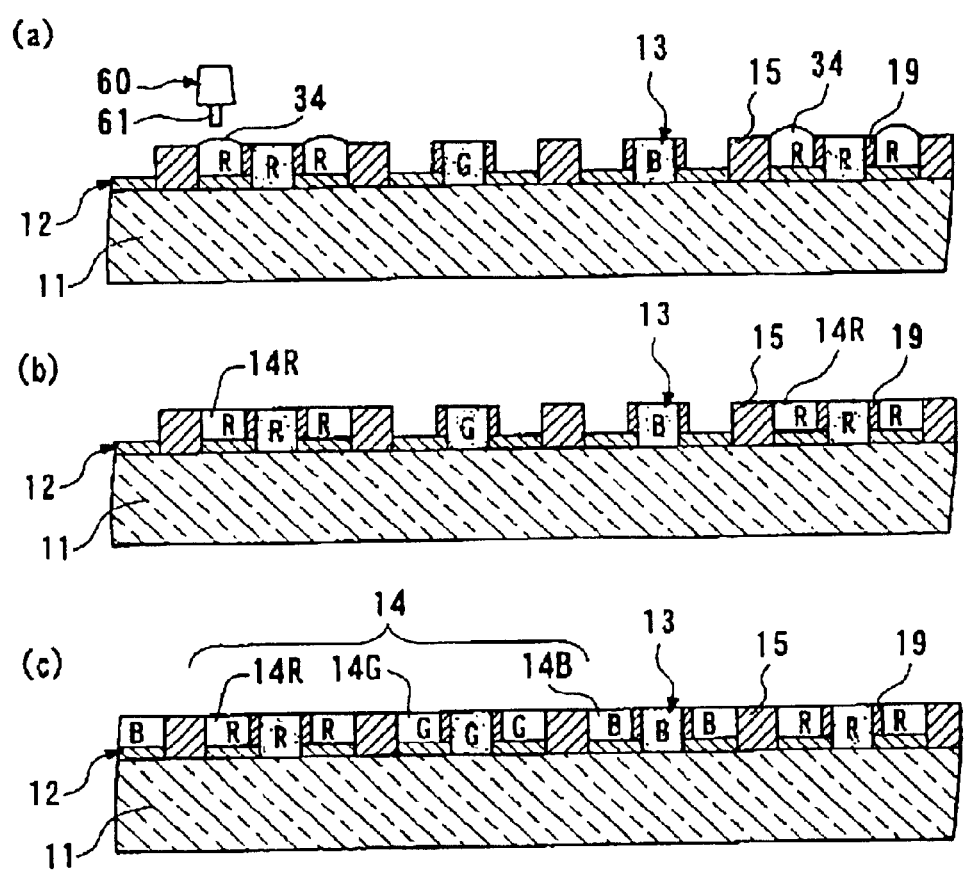
FIG. 11 includes views each showing a step of the manufacturing method of the color filter substrate provided in the transflective liquid crystal device according to the second embodiment of the present invention.

Next, referring to FIGS. 10 and 11, a method for manufacturing the color filter substrate 10 provided in the transflective liquid crystal device 2 of this embodiment will be described. FIGS. 10(a) to (e) and FIGS. 11(a) to (c) are each a schematic cross-sectional view of the color filter substrate 10 in a manufacturing step.

First, as shown in FIG. 10(a), on the base body 11 at the liquid crystal layer 30 side, the transflective layers 12 and the shading layers 15 each having a predetermined pattern are sequentially formed by a photolithographic method. Since the methods for forming the transflective layers 12 and the shading layers 15 by a photolithographic method are described above, the descriptions thereof are omitted.

Next, as shown in FIG. 10(b), on the base body 11 provided with the transflective layers 12 and the shading layers 15, the partitions 19 having a pattern shown in FIGS. 8 and 9 are formed by a photolithographic method. That is, after a resist (partition material) having photosensitivity is applied by spin coating or the like to the entire surface of the base body 11 provided with the transflective layers 12 and the shading layers 15, annealing, exposure, and development of the resist are performed, thereby forming the partitions 19 having a predetermined pattern.

Next, by an inkjet method, the first color filters 13 (color portions 13R to 13B) are formed.

That is, as shown in FIG. 10(c), the red ink (coloring material) 33 is filled in the inkjet nozzle 60, and droplets of the red ink 33 are supplied from the discharge nozzle 61 only to the regions at which the color portions 13R of the first color filters 13 are to be formed. In this step, as shown in the figure, since the partitions 19 are formed along the peripheries of the regions at which the color portions 13R of the first color filters 13 are to be formed, the red ink 33 can be supplied to the regions surrounded by the partitions 19. Next, as shown in FIG. 10(d), by calcining the red ink 33, the color portions 13R of the first color filters 13 can be formed.

Next, by repeating the steps shown in FIGS. 10(c) and (d) for the blue color portions 13G and the blue color portions 13B, the color portions 13R to 13B each having a predetermined pattern are formed as shown in FIG. 10(e). Subsequently, by annealing the color portions 13R to 13B, the first color filters 13 formed of the color portions 13R to 13B each having a predetermined pattern can be formed.

Next, by an inkjet method, the second color filters 14 (color portions 14R to 14B) are formed.

That is, as shown in FIG. 11(a), the red ink (coloring material) 34 is filled in the inkjet nozzle 60, and droplets of the red ink 34 are supplied from the discharge nozzle 61 only to the regions at which the color portions 14R of the second color filters 14 are to be formed. In this step, as shown in the figure, since the partitions 19 and the shading layers 15 are formed along the peripheries of the regions at which the color portions 14R of the second color filters 14, the red ink 34 can be supplied to the regions surrounded by the partitions 19 and the shading layers 15. Next, as shown in FIG. 11(b), by calcining the red ink 34, the color portions 14R of the second color filters 14 can be formed.

Next, by repeating the steps shown in FIGS. 11(a) and (b) for the blue color portions 14G and the blue color portions 14B, the color portions 14R to 14B each having a predetermined pattern are formed as shown in FIG. 11(c). Subsequently, by annealing the color portions 14R to 14B, the second color filters 14 formed of the color portions 14R to 14B each having a predetermined pattern can be formed.

As described above, the transflective layers 12, the shading layers 15, the partitions 19, the first color filters 13, and the second color filters 14 are formed, and when the overcoat layer 16, the transparent electrodes 17, and the alignment film 18 are then laminated to each other in that order, the color filter substrate 10 can be formed.

According to the manufacturing method of the color filter substrate described above, since the first color filters 13 and the second color filters 14 can be formed by an inkjet method, compared to the manufacturing method of the color filter substrate in the first embodiment, simplification of the manufacturing process and manufacturing cost saving can be further performed.

In this manufacturing method of the color filter substrate, the case in which the partitions 19 are formed after the shading layers 15 are formed is described. However, the present invention is not limited thereto, and the shading layers 15 may be formed after the partitions 19 are formed. In addition, when the partitions 19 and the shading layers 15 are formed of the same material, they may be formed in the same step.

In the manufacturing method of the color filter substrate described above, the case in which the second color filters 14 are formed after the color portions 13R to 13B of the first color filters 13 are fired is described. However, the present invention is not limited thereto, and the annealing of the color portions 13R to 13B of the first color filters 13 and the annealing of the color portions 14R to 14B of the second color filters 14 may be performed at the same time.

In addition, the case in which the second color filters 14 are formed by an inkjet method after the first color filters 13 are formed by an inkjet method is described. However, the present invention is not limited thereto, and after the second color filters 14 are formed by an inkjet method, the first color filters 13 may be formed by an inkjet method.

Furthermore, by using an inkjet head having six types of inkjet nozzles 60 for the respective color portions 13R to 13B and the color portions 14R to 14B and by sequentially supplying, while the head is operated, six types of inks to the regions in each pixel at which the respective color portions 13R to 13B and the color portions 14R to 14G are to be formed, the color portions 13R to 13B and the color portions 14R to 14G can be continuously formed. When the color portions 13R to 13B and the color portions 14R to 14G are continuously formed, it is preferable since simplification of the manufacturing process and manufacturing cost saving can be further performed.

Third Embodiment

Figure 12:
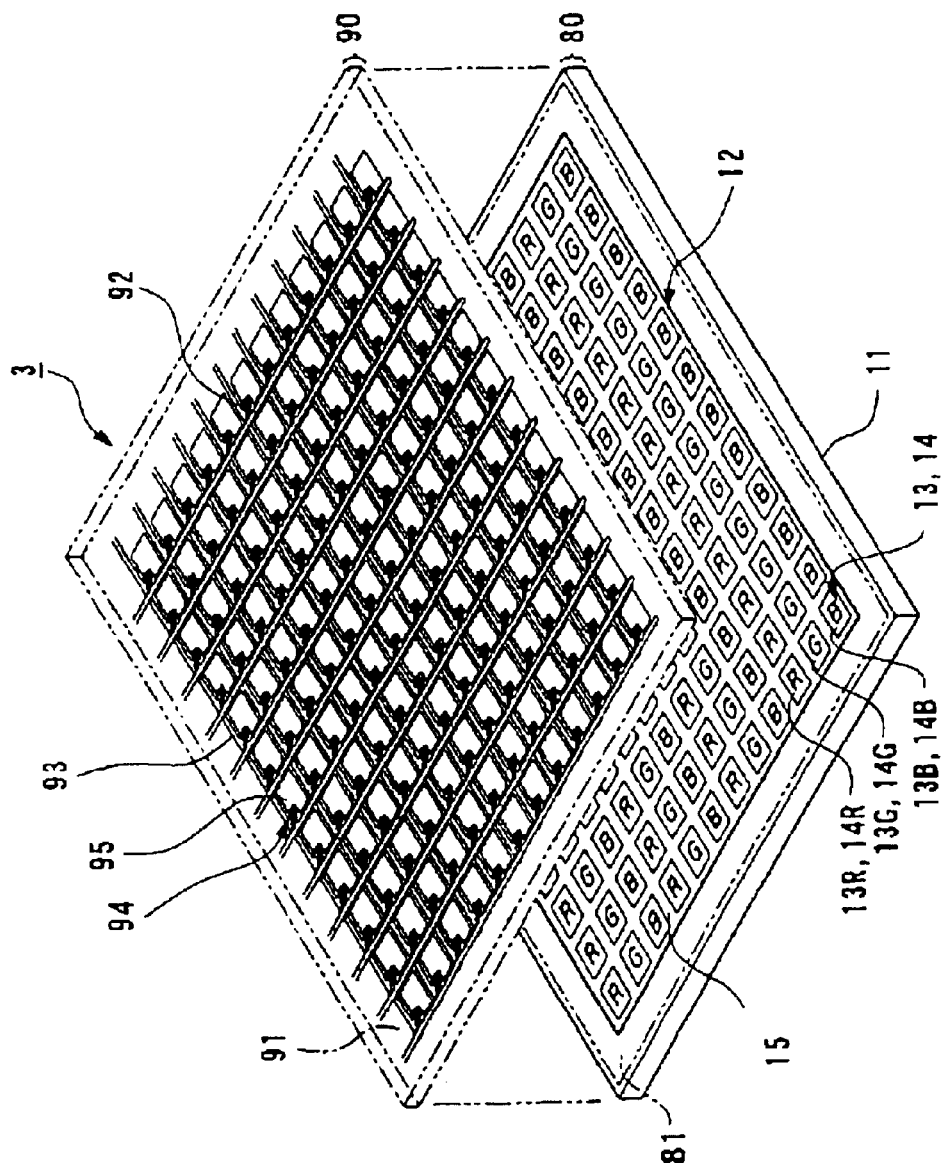
FIG. 12 is an exploded, schematic, perspective view showing the entire structure of a transflective liquid crystal device according to a third embodiment of the present invention.

Next, the structure of a transflective liquid crystal device according to a third embodiment of the present invention will be described with reference to FIG. 12. In the first and the second embodiments, the passive matrix transflective liquid crystal devices are described by way of example, and in this embodiment, an example in which the present invention is applied to an active matrix transflective liquid crystal device which uses TFT (Thin-Film Transistor) elements functioning as a switching element will be described. FIG. 12 is an exploded, schematic, perspective view showing the entire structure of the transflective liquid crystal device of this embodiment. FIG. 12 is a view corresponding to FIG. 1 in the first embodiment, and a liquid crystal panel provided in the transflective liquid crystal device of this embodiment is only shown in this figure. In addition, in this embodiment, the upper side in the figure shows the observer side (viewing side).

A transflective liquid crystal device 3 of this embodiment comprises a liquid crystal panel formed of a color filter substrate 80, an elemental substrate (counter substrate) 90, and a liquid crystal layer (not shown) provided therebetween, and a backlight (not shown) provided at the side opposite to the observer side of the liquid crystal panel.

The elemental substrate 90 is primarily formed of a base body 91; TFT elements 94, pixel electrodes 95, and the like provided on the base body 91 at the liquid crystal layer side: and an alignment film (not shown) further provided at the liquid crystal layer side. In more particular, in the elemental substrate 90, a number of data lines 92 and a number of scanning lines 93 are provided on the surface of the base body 91 to intersect each other, thereby forming a grid pattern. In the vicinity of each intersection between the data line 92 and the scanning line 93, the TFT element 94 is formed, and the pixel electrodes 95 are connected thereto via each TFT element 94. When the entire surface of the elemental substrate 90 at the liquid crystal layer side is viewed, a number of the pixel electrodes 95 are disposed in a matrix, and in the transflective liquid crystal device 3, a region at which each pixel electrode 95 is formed and a region in the vicinity thereof form each dot.

The color filter substrate 80 has the structure equivalent to that provided in the transflective liquid crystal device of the first embodiment except that a common electrode 81 formed over almost the entire surface of the color filter substrate 80 is provided instead of the plurality of transparent electrodes formed in a stripe pattern. That is, on the base body 11 at the liquid crystal layer side, the transflective layers 12, the first color filters 13 composed of the color portions 13R to 13B, the second color filters 14 composed of the color portions 14R to 14B, the shading layers 15, the overcoat layer (not shown), the common electrode 81, and the alignment film (not shown) are provided, so that the primary structure of the color filter substrate 80 is formed.

In order to avoid complicated figures, the first color filters 13 and the second color filters 14 are shown together; however, as described above in the first embodiment, actually, the color portions 13R to 13B of the first color filters 13 are formed so as to correspond to the light transmission portions of the transflective layers 12, and the second color filters 14 are formed so as to correspond to the light reflection portions of the transflective layers 12.

As described above, the present invention can be applied to the active matrix transflective liquid crystal device using the TFT elements, and according to this embodiment, as in the first and the second embodiments, the first color filter 13 and the second color filter 14, having different spectral characteristics from each other, are formed so as to correspond to the light transmission portion and the light reflection portion of the transflective layer 12, respectively. As a result, the color purity of display in a transmission mode can be improved while the brightness and color purity of display in a reflection mode are not degraded, and hence a transflective liquid crystal device having superior image quality can be provided.

Fourth Embodiment

Figure 13:
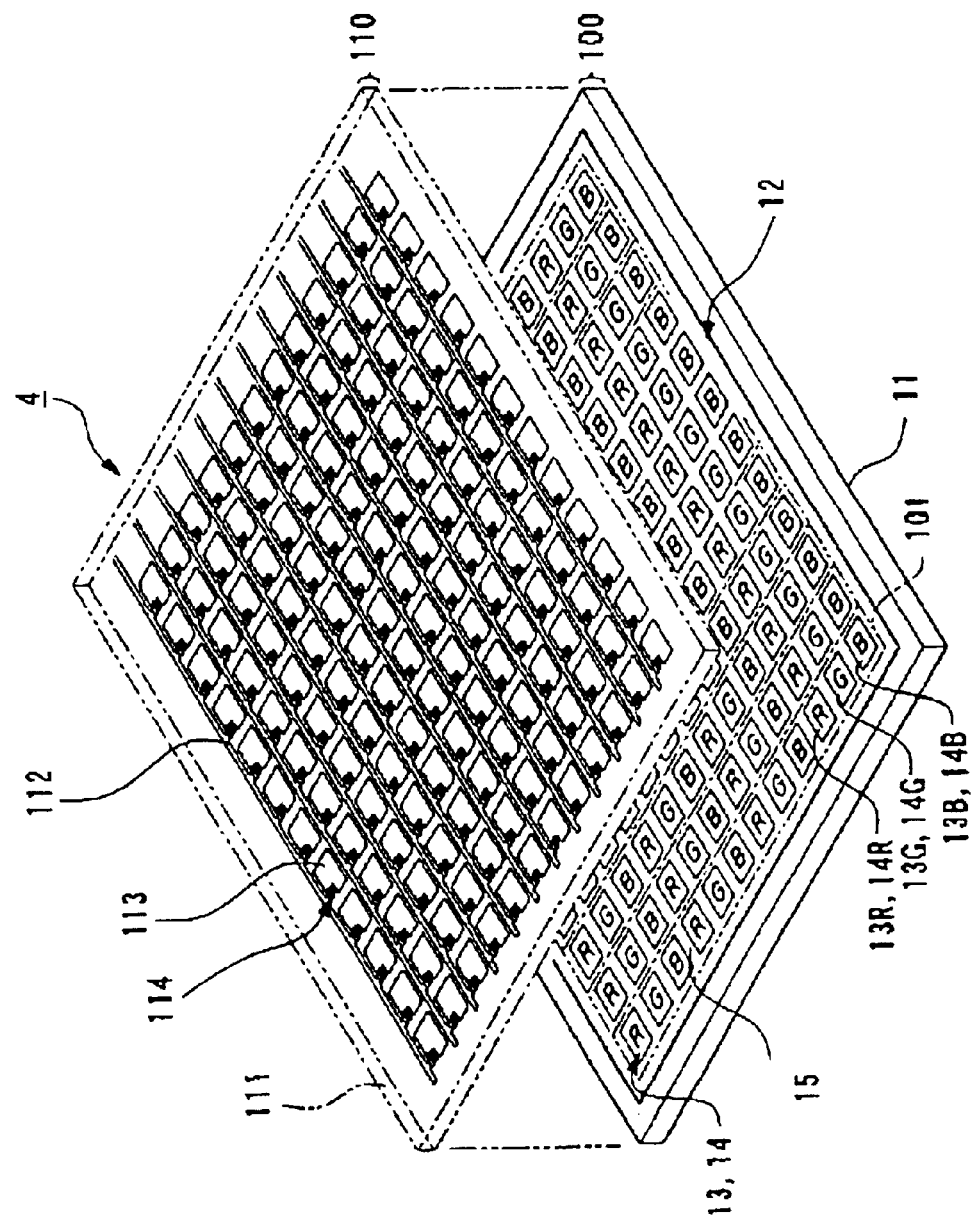
FIG. 13 is an exploded, schematic, perspective view showing the entire structure of a transflective liquid crystal device according to a fourth embodiment of the present invention.

Next, the structure of a transflective liquid crystal device according to a fourth embodiment of the present invention will be described with reference to FIG. 13. In this embodiment, an example in which the present invention is applied to an active matrix transflective liquid crystal device, which uses TFD (Thin-Film Diode) elements functioning as a switching element, will be described. FIG. 13 is an exploded, schematic, perspective view showing the entire structure of the transflective liquid crystal device of this embodiment. FIG. 13 is a view corresponding to FIG. 1 in the first embodiment, and a liquid crystal panel provided in the transflective liquid crystal device of this embodiment is only shown in this figure. In addition, in this embodiment, the upper side in the figure also shows the observer side (viewing side).

A transflective liquid crystal device 4 of the present invention comprises a liquid crystal panel formed of a color filter substrate 100, an elemental substrate (counter substrate) 110, and a liquid crystal layer (not shown) provided therebetween, and a backlight (not shown) provided at the side opposite to the observer side of the liquid crystal panel.

The elemental substrate 110 is primarily formed of a base body 111; TFD elements 114, pixel electrodes 113, and the like provided on the base body 111 at the liquid crystal layer side: and an alignment film (not shown) further provided at the liquid crystal layer side. In more particular, on the surface of the base body 111 of the elemental substrate 110, a number of the data lines 112 are provided in a stripe pattern, and a number of the pixel electrodes 113 are connected to each data line 112 via the TFD elements 114. When the entire surface of the elemental substrate 110 at the liquid crystal layer side is viewed, a number of the pixel electrodes 113 are disposed in a matrix, and in the transflective liquid crystal device 4, a region at which each pixel electrode 113 is formed and a region in the vicinity thereof form each dot.

The color filter substrate 100 has the structure equivalent to that provided in the transflective liquid crystal device of the first embodiment except that a plurality of strip scanning lines (counter electrodes) 101, which extend to intersect the extending data lines 112 provided on the elemental substrate 110, are provided instead of the plurality of transparent electrodes formed in a stripe pattern. That is, on the base body 11 at the liquid crystal layer side, the transflective layers 12, the first color filters 13 composed of the color portions 13R to 13B, the second color filters 14 composed of the color portions 14R to 14B, the shading layers 15, the overcoat layer (not shown), the scanning lines 101, and the alignment film (not shown) are provided, so that the primary structure of the color filter substrate 100 is formed.

In order to avoid complicated figures, the first color filters 13 and the second color filters 14 are shown together; however, as described above in the first embodiment, actually, the color portions 13R to 13B of the first color filters 13 are formed so as to correspond to the light transmission portions of the transflective layers 12, and the second color filters 14 are formed so as to correspond to the light reflection portions of the transflective layers 12.

As described above, the present invention can be applied to the active matrix transflective liquid crystal device using the TFD elements, and according to this embodiment, as in the first and the second embodiments, the first color filter 13 and the second color filter 14, having different spectral characteristics from each other, are formed so as to correspond to the light transmission portion and the light reflection portion of the transflective layer 12, respectively. As a result, the color purity of display in a transmission mode can be improved while the brightness and color purity of display in a reflection mode are not degraded, and hence a transflective liquid crystal device having superior image quality can be provided.

Fifth Embodiment

Structure of Transflective Liquid Crystal Device

Next, the structure of a transflective liquid crystal device according to a fifth embodiment of the present invention will be described. In this embodiment, as in the first embodiment, an example in which the present invention is applied to a passive matrix liquid crystal device will be described.

Figure 14:
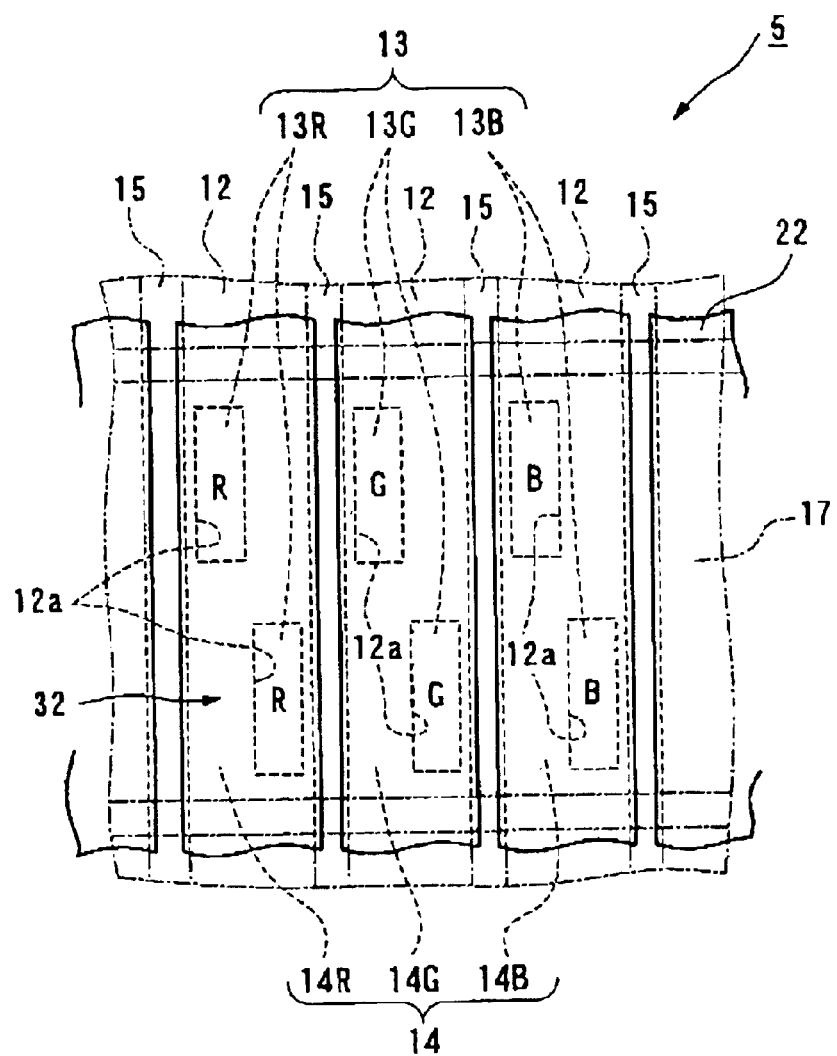
FIG. 14 is a schematic plan view showing an important portion including transflective layers, color filters, and shading layers, which is viewed from the liquid crystal layer side, of a transflective liquid crystal device according to a fifth embodiment of the present invention.

Since the primary structure of the transflective liquid crystal device of this embodiment is equivalent to that of the first embodiment, the same reference numerals of the constituent elements in the first embodiment designate the same constituent elements in this embodiment, and descriptions thereof are omitted. This embodiment will be described with reference to FIG. 14 corresponding to FIG. 2 in the first embodiment. FIG. 14 is a schematic plan view of the transflective layers, the color filters, and the shading layers provided for the transflective liquid crystal device of this embodiment when viewed from the liquid crystal layer side.

As shown in FIG. 14, according to a transflective liquid crystal device 5 of this embodiment, in each dot 32, the color portions of the first color filter 13 are formed at positions corresponding to two light transmission portions (aperture portions 12a) formed on one diagonal line of each rectangular area of the transflective layer 12, and the color portion of the second color filter 14 having different spectral characteristics from that of the first color filter 13 is formed at a position corresponding to a light reflection portion (region other than the aperture portions 12a) of the transflective layer 12. This is the only point of this embodiment different from the first embodiment.

As described above, in this embodiment, since the color portions of first color filter 13 are formed at the positions corresponding to the two light transmission portions (aperture portions 12a) formed in the transflective layer 12, and the color portion of the second color filter 14 is formed at the position corresponding to the light reflection portion (region other than the aperture portions 12a) of the transflective layer 12, the same advantages as those in the first embodiment can be obtained.

In the transflective liquid crystal device 5 of this embodiment, the structure in which the two light transmission portions (aperture portions 12a) are provided on one of the diagonal lines of each rectangular area of the transflective layer 12 is formed. However, as long as the two light transmission portions (aperture portions 12a) are formed in each rectangular area of the transflective layer 12, the two light transmission portions may be formed on the other diagonal line of each rectangular area of the transflective layer 12 or may be formed in the longitudinal direction thereof. In addition, the number of the light transmission portions is not limited to two, and a plurality of aperture portions may be formed.

Sixth Embodiment

Structure of Transflective Liquid Crystal Device

Next, the structure of a transflective liquid crystal device according to a sixth embodiment of the present invention will be described. In this embodiment, as in the first embodiment, an example in which the present invention is applied to a passive matrix liquid crystal device will be described.

Figure 15:
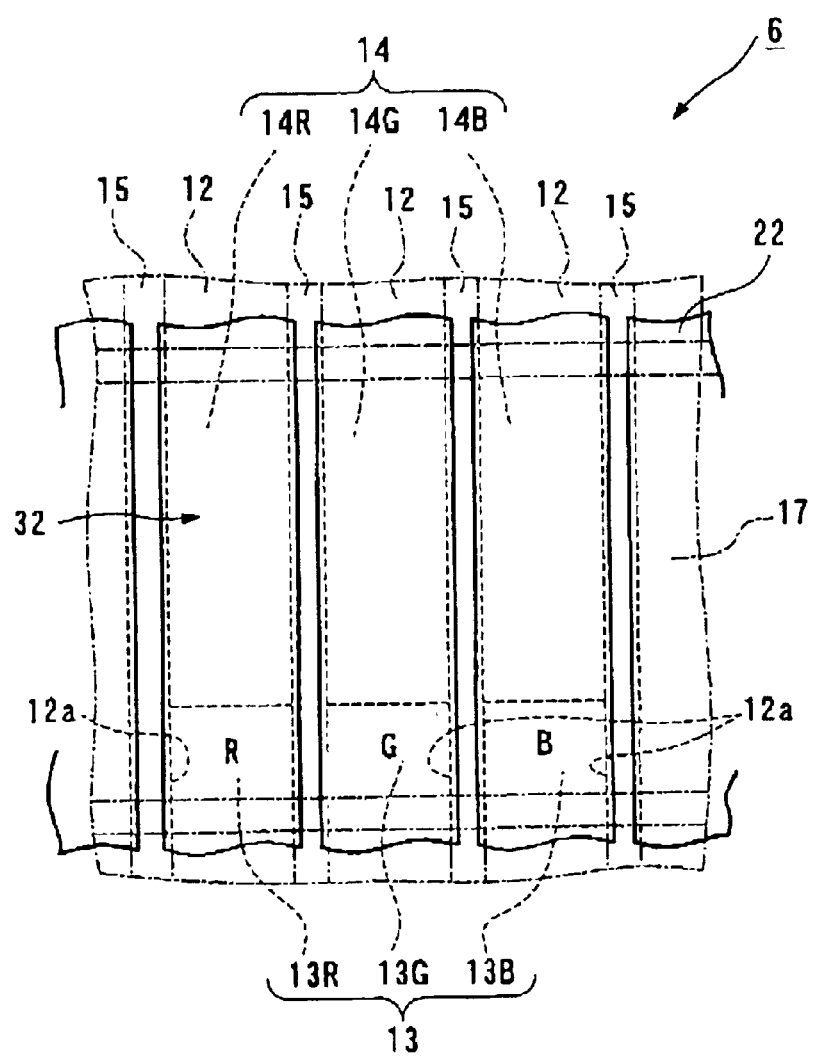
FIG. 15 is a schematic plan view showing an important portion including transflective layers, color filters, and shading layers, which is viewed from the liquid crystal layer side, of a transflective liquid crystal device according to a sixth embodiment of the present invention.

Since the primary structure of the transflective liquid crystal device of this embodiment is equivalent to that of the first embodiment, the same reference numerals of the constituent elements in the first embodiment designate the same constituent elements in this embodiment, and the descriptions thereof are omitted. This embodiment will be described with reference to FIG. 15 corresponding to FIG. 2 in the first embodiment. FIG. 15 is a schematic plan view of the transflective layers, the color filters, and the shading layers provided for the transflective liquid crystal device of this embodiment when viewed from the liquid crystal layer side.

As shown in FIG. 15, according to a transflective liquid crystal device 6 of this embodiment, in each dot 32, the color portion of the first color filter 13 is formed at a position corresponding to a rectangular light transmission portion (aperture portion 12a) formed at one end portion of each rectangular area of the transflective layer 12, and the color portion of the second color filter 14 having different spectral characteristics from that of the first color filter 13 is formed at a position corresponding to a light reflection portion (region other than the aperture portion 12a) of the transflective layer 12. This is the only point of this embodiment different from the first embodiment.

As described above, in this embodiment, since the color portion of the first color filter 13 is formed at the position corresponding to the light transmission portion (aperture portion 12a) formed in each rectangular area of the transflective layer 12, and the color portion of the second color filter 14 is formed at the position corresponding to the light reflection portion (region other than the aperture portion 12a) of each rectangular area of the transflective layer 12, the same advantages as those in the first embodiment can be obtained.

In the transflective liquid crystal device 6 of this embodiment, the structure in which the light transmission portion (aperture portion 12a) is provided at one end portion of each rectangular area of the transflective layer 12 is formed. However, as long as the light transmission portion (aperture portion 12a) is formed in each rectangular area of the transflective layer 12, the light transmission portion may be formed at any place and may be formed at the other end portion of each rectangular area of the transflective layer 12.

Seventh Embodiment

Structure of Transflective Liquid Crystal Device

Next, the structure of a transflective liquid crystal device according to a seventh embodiment of the present invention will be described. In this embodiment, as in the fifth embodiment, an example in which the present invention is applied to a passive matrix liquid crystal device will be described.

Figure 16:
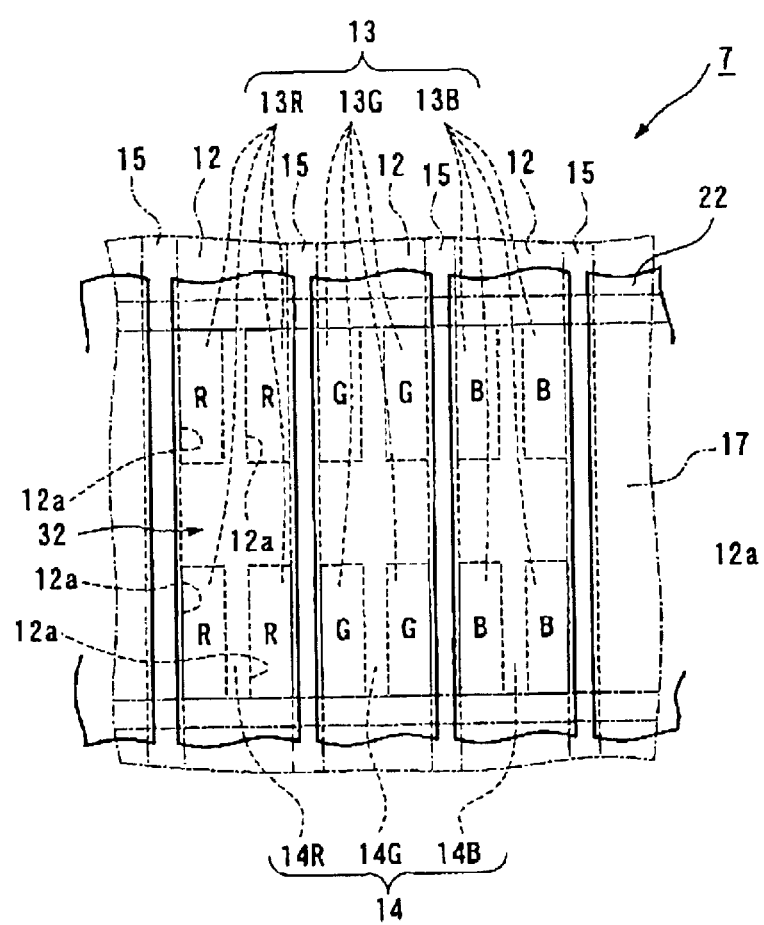
FIG. 16 is a schematic plan view showing an important portion including transflective layers, color filters, and shading layers, which is viewed from the liquid crystal layer side, of a transflective liquid crystal device according to a seventh embodiment of the present invention.

Since the primary structure of the transflective liquid crystal device of this embodiment is equivalent to that of the fifth embodiment, the same reference numerals of the constituent elements in the fifth embodiment designate the same constituent elements in this embodiment, and the descriptions thereof are omitted. This embodiment will be described with reference to FIG. 16 corresponding to FIG. 14 in the fifth embodiment. FIG. 16 is a schematic plan view of the transflective layers, the color filters, and the shading layers provided for the transflective liquid crystal device of this embodiment when viewed from the liquid crystal layer side.

As shown in FIG. 16, according to a transflective liquid crystal device 7 of this embodiment, in each dot 32, the color portions of the first color filter 13 are formed at positions corresponding to four light transmission portions (aperture portions 12a) formed at four corners of each rectangular area of the transflective layer 12, and the color portion of the second color filter 14 having different spectral characteristics from that of the first color filter 13 is formed at a position corresponding to a light reflection portion (region other than the aperture portions 12a) of the transflective layer 12. This is the only point of this embodiment different from the fifth embodiment.

As described above, in this embodiment, since the color portions of first color filter 13 are formed at the position corresponding to the four light transmission portions (aperture portions 12a) formed in each rectangular area of the transflective layer 12, and the color portion of the second color filter 14 is formed at the position corresponding to the light reflection portion (region other than the aperture portions 12a) of each rectangular area of the transflective layer 12, the same advantages as those in the fifth embodiment can be obtained.

Eighth Embodiment

Structure of Transflective Liquid Crystal Device

Next, the structure of a transflective liquid crystal device according to an eighth embodiment of the present invention will be described. In this embodiment, as in the first embodiment, an example in which the present invention is applied to a passive matrix liquid crystal device will be described.

Figure 17:
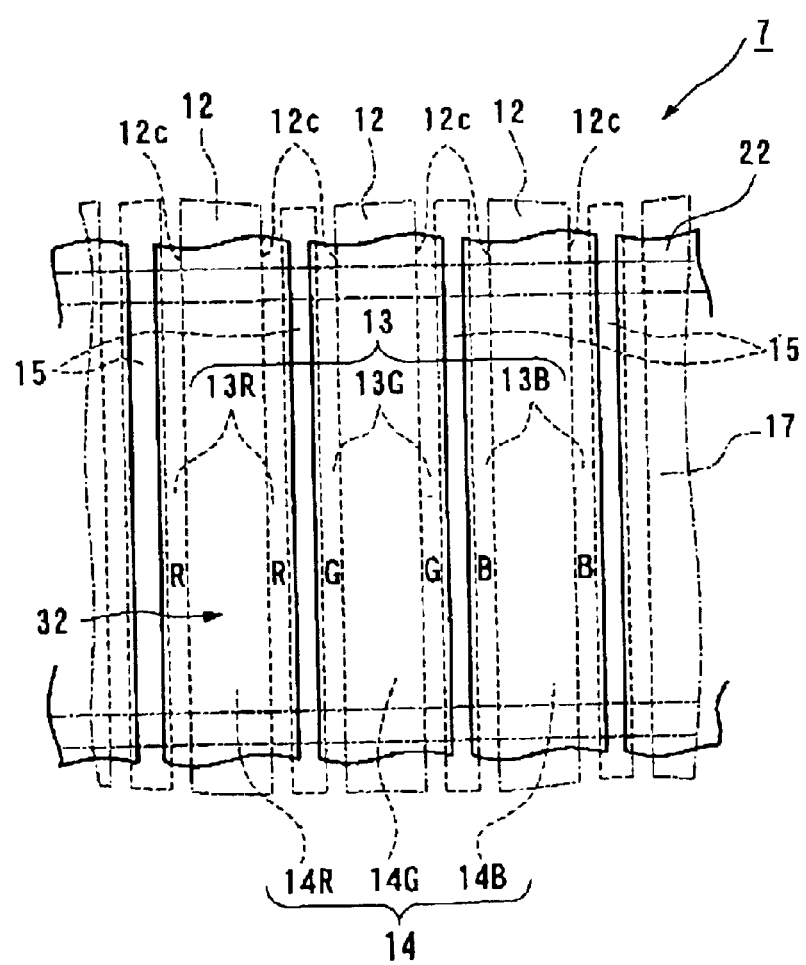
FIG. 17 is a schematic plan view showing an important portion including transflective layers, color filters, and shading layers, which is viewed from the liquid crystal layer side, of a transflective liquid crystal device according to an eighth embodiment of the present invention.

Since the primary structure of the transflective liquid crystal device of this embodiment is equivalent to that of the first embodiment, the same reference numerals of the constituent elements in the first embodiment designate the same constituent elements in this embodiment, and the descriptions thereof are omitted. This embodiment will be described with reference to FIG. 17 corresponding to FIG. 2 in the first embodiment. FIG. 17 is a schematic plan view of the transflective layers, the color filters, and the shading layers provided for the transflective liquid crystal device of this embodiment when viewed from the liquid crystal layer side.

As shown in FIG. 17, according to a transflective liquid crystal device 8 of this embodiment, in each dot 32, the color portions of the first color filter 13 are formed at positions corresponding to the light transmission portions (slit portions 12c) formed at two sides in the longitudinal direction of each rectangular area of the transflective layer 12, and the color portion of the second color filter 14 having different spectral characteristics from that of the first color filter 13 is formed at a position corresponding to a light reflection portion (region other than the slit portions 12c) of each rectangular area of the transflective layer 12. This is the only point of this embodiment different from the first embodiment.

As described above, in this embodiment, since the color portions of the first color filter 13 are formed at the position corresponding to the light transmission portions (slit portions 12c) formed at the two sides of the transflective layer 12, and the color portion of the second color filter 14 is formed at the position corresponding to the light reflection portion (region other than the slit portions 12c) of each rectangular area of the transflective layer 12, the same advantages as those in the first embodiment can be obtained.

The transflective liquid crystal device 8 of this embodiment has the structure in which the rectangular light transmission portions (slit portions 12c) are formed at the two sides of the transflective layer 12; however, these light transmission portions (slit portions 12c) may be formed at one side of each rectangular area of the transflective layer 12.

Ninth Embodiment

Structure of Transflective Liquid Crystal Device

Next, the structure of a transflective liquid crystal device according to a ninth embodiment of the present invention will be described. In this embodiment, as in the eighth embodiment, an example in which the present invention is applied to a passive matrix liquid crystal device will be described.

Figure 18:
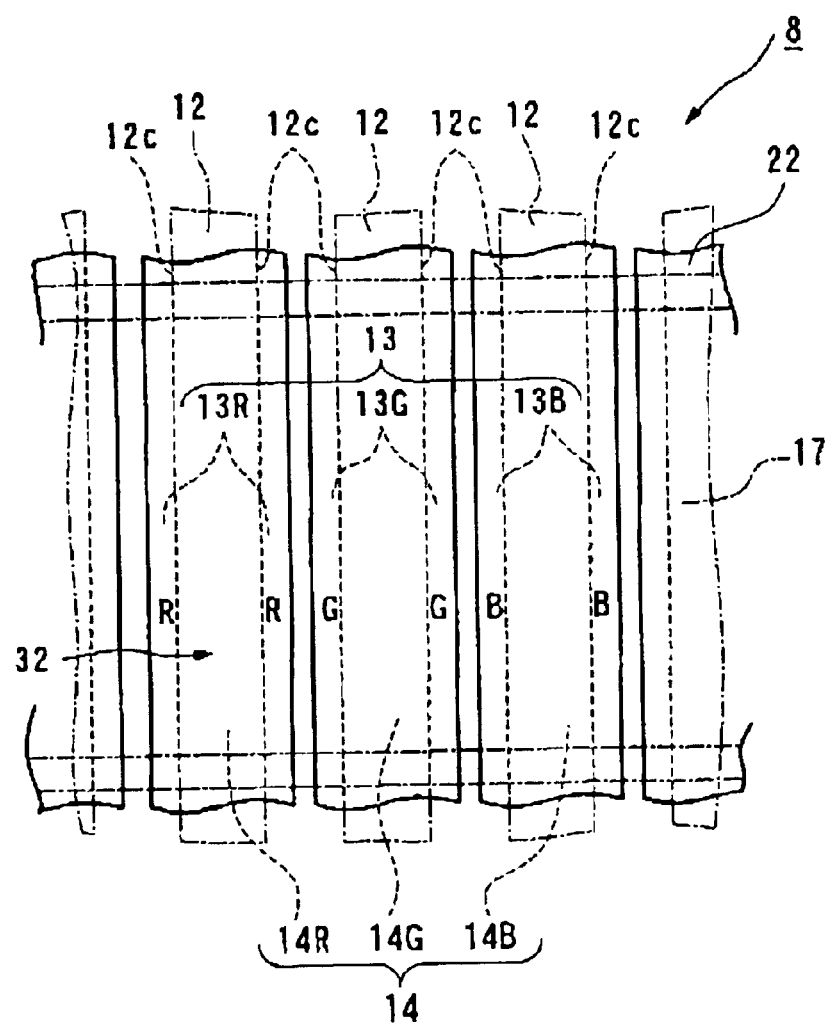
FIG. 18 is a schematic plan view showing an important portion including transflective layers, and color filters, which is viewed from the liquid crystal layer side, of a transflective liquid crystal device according to a ninth embodiment of the present invention.

Since the primary structure of the transflective liquid crystal device of this embodiment is equivalent to that of the eighth embodiment, the same reference numerals of the constituent elements in the eighth embodiment designate the same constituent elements in this embodiment, and descriptions thereof are omitted. This embodiment will be described with reference to FIG. 18 corresponding to FIG. 17 in the eighth embodiment. FIG. 18 is, a schematic plan view of the transflective layers and the color filters provided for the transflective liquid crystal device of this embodiment when viewed from the liquid crystal layer side.

As shown in FIG. 18, according to a transflective liquid crystal device 9 of this embodiment, the shading layer 15 in each dot 32 provided between the adjacent transflective layers 12 is removed, and this is the only point of this embodiment different from that of the eighth embodiment.

As described above, in this embodiment, since the shading layers 15 each provided between the neighboring transflective layers 12 are removed, the same advantages as those in the eighth embodiment can be obtained.

The transflective liquid crystal device 9 of this embodiment also has the structure in which the two rectangular light transmission portions (slit portions 12c) are formed at the two sides of each rectangular area of the transflective layer 12; however, these light transmission portions (slit portions 12c) may be formed at one side of each rectangular area of the transflective layer 12.

In the first to the ninth embodiments described above, the cases in which the color filter substrate is provided at the backlight side is described; however, the present invention is not limited thereto and can be applied to the case in which the color filter substrate is provided at the observer side. However, when the color filter substrate is provided at the observer side, the transflective layers must be provided at the counter substrate side.

Electronic Apparatus

Next, an example of an electronic apparatus provided with one of the transflective liquid crystal device 1 to 9 according to the above-described embodiments of the present invention will be described.

FIG. 19(a) is a perspective view showing an example of a mobile phone. In FIG. 19(a), reference numeral 500 indicates a mobile phone body and reference numeral 501 indicates a liquid crystal display portion provided with one of the transflective liquid crystal devices 1 to 9 described above.

FIG. 19(b) is a perspective view showing an example of a mobile information processing apparatus such as a word processor or a personal computer. In FIG. 19(b), reference numeral 600 indicates an information processing apparatus, reference numeral 601 indicates an input portion such as a key board, reference numeral 603 indicates an information processing body, and reference numeral 602 indicates a liquid crystal display portion provided with one of the transflective liquid crystal devices 1 to 9 described above.

FIG. 19(c) is a perspective view showing an example of a wristwatch type electronic apparatus. In FIG. 19(c), reference numeral 700 indicates a watch body and reference numeral 701 indicates a liquid crystal display portion provided with one of the transflective liquid crystal devices 1 to 9 described above.

Since the electronic apparatuses shown in FIGS. 19(a) to (c) are provided with one of the transflective liquid crystal devices 1 to 9 according to the above embodiments, while the brightness and color purity of display in a reflection mode are not degraded, the color purity of display in a transmission mode can be improved, and hence superior image quality can be obtained.

Advantages

As described above in detail, according to the present invention, the color filter substrate having the structure in which the first color filters 13 and the second color filters 14 having spectral characteristics different from each other are formed so as to correspond to the light transmission portions and the light reflection portions of the transflective layers, respectively, can be provided for a transflective liquid crystal device. Accordingly, the color purity of display in a transmission mode can be improved while the brightness and color purity of display in a reflection mode are not degraded.

In addition, according to the method for manufacturing the color filter substrate of the present invention, of the first color filter and the second color filter, at least one of the color filter can be formed by an inkjet method, simplification of the manufacturing process and manufacturing cost saving can be performed.

Furthermore, by using the color filter substrate of the present invention, the liquid crystal device (transflective liquid crystal device) having superior image quality of the present invention can be provided in which the color purity of display in a transmission mode can be improved while the brightness and color purity of display in a reflection mode are not degraded. In addition, by using the liquid crystal device (transflective liquid crystal device) of the present invention, the electronic apparatus of the present invention having superior image quality can be provided in which the color purity of display in a transmission mode can be improved while the brightness and color purity of display in a reflection mode are not degraded.

The entire disclosure of Japanese Patent Application Nos. 2001-285382 filed Sep. 19, 2001 and 2002-227676 filed Aug. 5, 2002 are incorporated by reference.

What is claimed is:

1. A color filter substrate for forming a liquid crystal panel, comprising:

a base body;

transflective layers provided on the base body, each transflective layer having light transmission portions and light reflection portions; and color filters provided on the base body, each color filter having a first color filter formed of color portions having colors different from each other and a second color filter formed of color portions having colors different from each other;

wherein the first color filter is provided so that the color portions thereof correspond to the light transmission portions of the transflective layers;

wherein the second color filter is provided so that the color portions thereof correspond to the light reflection portions of the transflective layers; and wherein the first color filter has spectral characteristics different from those of each second color filter, the different spectral characteristics are realized by varying at least one of:

the compositions of the color portions of the first color filter and the second color filter; and the compositions and thicknesses of the color portions of the first color filter and the second color filter.

2. A color filter substrate according to claim 1, wherein spectral characteristics of the first color filter are adjusted by compositions of the color portions of the first color filter or by the compositions and thicknesses thereof, and spectral characteristics of the second color filter are adjusted by compositions of the color portions of the second color filter or by the compositions and thicknesses thereof.

3. A color filter substrate according to claim 1, wherein at least one of the light transmission portions and at least one of the light reflection portions of the transflective layer are provided in each dot which forms a display region of the liquid crystal panel, and one of the color portions of the first color filter and one of the color portions of the second color filter, which are provided in the same dot, have the same color.

4. A color filter substrate according to claim 3, further comprising a shading layer provided along the periphery of each dot which forms the display region of the liquid crystal panel.

5. A liquid crystal device in which display in a transmission mode or display in a reflection mode is selectively performed by a switching operation, comprising:

a liquid crystal panel; and lighting means disposed at the side opposite to a viewing side of the liquid crystal panel, the liquid crystal panel comprising:

a color filter substrate;

a counter substrate opposing thereto;

a liquid crystal layer provided between the color filter substrate and the counter substrate;

transflective layers provided on one of the color filter substrate and the counter substrate, each having light transmission portions and light reflection portions; and color filters provided on the color filter substrate, each having a first color filter formed of color portions having colors different from each other and a second color filter formed of color portions having colors different from each other;

wherein the first color filter is provided so that the color portions thereof correspond to the light transmission portions of the transflective layers;

wherein the second color filter is provided so that the color portions thereof correspond to the light reflection portions of the transflective layers; and wherein the first color filter has spectral characteristics different from those of the second color filter, the different spectral characteristics are realized by varying at least one of:

the compositions of the color portions of the first color filter and the second color filter; and the compositions and thicknesses of the color portions of the first color filter and the second color filter.

6. A liquid crystal device according to claim 5, wherein the spectral characteristics of the first color filter are adjusted by compositions of the color portions of the first color filter or by the compositions and thicknesses thereof, and the spectral characteristics of the second color filter are adjusted by compositions of the color portions of the second color filter or by the compositions and thicknesses thereof.

7. A liquid crystal device according to one of claim 5, wherein at least one of the light transmission portions and at least one of the light reflection portions of the transflective layer are provided in each dot which forms a display region of the liquid crystal panel, and one of the color portions of the first color filter and one of the color portions of the second color filter, which are provided in the same dot, have the same color.

8. A liquid crystal device according to claim 7, wherein the color filter substrate comprises a shading layer provided along the periphery of each dot which forms the display region of the liquid crystal panel.

9. A liquid crystal display device comprising:

a color filter substrate;

a counter substrate opposite said color filter substrate;

a liquid crystal layer positioned between said color filter substrate and said counter substrate;

a transflective layer at least partially in contact with said color filter substrate, said transflective layer having light transmission portions and light reflection portions;

a first color filter at least partially in contact with said color filter substrate, said first color filter having first color portions with first color particles corresponding to said light transmission portions of said transflective layer;

a second color filter at least partially in contact with said color filter substrate, said second color filter having second color portions with second color particles corresponding to said light reflection portions of said transflective layer;

wherein said first color portions and said second color portions have different color compositions to provide different spectral characteristics between said first color filter and said second color filter.

10. The liquid crystal display device of claim 9, wherein said first color filter and said second color filter have different spectral characteristics due to differences in at least one of a concentration, a size, a shape, and a type of said first color particles as compared to said second color particles.

* * * * *